United States Patent
Xie et al.

(10) Patent No.: US 12,081,497 B2
(45) Date of Patent: Sep. 3, 2024

(54) COMMUNICATION METHOD AND COMMUNICATIONS DEVICE

(71) Applicant: Huawei Technologies Co., Ltd., Shenzhen (CN)

(72) Inventors: Xinqian Xie, Beijing (CN); Zhiheng Guo, Beijing (CN); Yi Long, Beijing (CN); Yongqiang Fei, Shenzhen (CN); Wenping Bi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 394 days.

(21) Appl. No.: 17/489,358

(22) Filed: Sep. 29, 2021

(65) Prior Publication Data
US 2022/0021509 A1  Jan. 20, 2022

Related U.S. Application Data

(63) Continuation of application No. PCT/CN2020/079065, filed on Mar. 12, 2020.

(30) Foreign Application Priority Data

Mar. 29, 2019 (CN) .......................... 201910253361.X

(51) Int. Cl.
*H04L 12/28* (2006.01)
*H04L 5/14* (2006.01)
(Continued)

(52) U.S. Cl.
CPC ........... *H04L 5/14* (2013.01); *H04W 72/0446* (2013.01); *H04W 88/06* (2013.01)

(58) Field of Classification Search
CPC ....... H04L 5/14; H04L 5/0048; H04L 5/0051; H04L 5/001; H04W 72/0446;
(Continued)

(56) References Cited

U.S. PATENT DOCUMENTS

| 9,642,124 B2 * | 5/2017 | Li .......................... H04W 72/23 |
| 2018/0092085 A1 * | 3/2018 | Shaheen ............... H04W 36/14 |
| 2018/0132282 A1 | 5/2018 | Ly et al. |

FOREIGN PATENT DOCUMENTS

| CN | 105308892 A | 2/2016 |
| CN | 107623950 A | 1/2018 |

(Continued)

OTHER PUBLICATIONS

"Updated summary of enhancements to single Tx switched uplink for EN-DC," 3GPP TSG RAN WG1 #96, R1-1903761, Athens, Greece, pp. 1-8, 3rd Generation Partnership Project, Valbonne, France (Feb. 25-Mar. 1, 2019).

(Continued)

*Primary Examiner* — Thai D Hoang
(74) *Attorney, Agent, or Firm* — Leydig, Voit & Mayer, Ltd.

(57) ABSTRACT

This application relates to a communication method and a communications device. The communication method includes: determining, a first signal to be sent on a first uplink carrier; determining a second signal to be sent on a second uplink carrier, where the first uplink carrier corresponds to a first radio access technology, and the second uplink carrier corresponds to a second radio access technology; and when a first transmission timing corresponding to the first signal is different from a second transmission timing corresponding to the second signal, and if the first signal and the second signal overlap in time domain, sending, a third signal, where the third signal is the second signal, or is the second signal or a part of the first signal, where the part of the first signal is carried on a symbol that does not overlap with a symbol corresponding the second signal.

20 Claims, 8 Drawing Sheets

(51) Int. Cl.
*H04W 72/0446* (2023.01)
*H04W 88/06* (2009.01)

(58) Field of Classification Search
CPC . H04W 88/06; H04W 72/23; H04W 72/1268; H04W 72/1215
See application file for complete search history.

(56) References Cited

FOREIGN PATENT DOCUMENTS

| CN | 108990154 A | | 12/2018 | | |
|---|---|---|---|---|---|
| CN | 109120382 A | | 1/2019 | | |
| CN | 109168179 A | | 1/2019 | | |
| WO | WO-2013166930 A1 | * | 11/2013 | ........... | H04B 7/2656 |
| WO | 2015116866 A1 | | 8/2015 | | |

OTHER PUBLICATIONS

"3rd Generation Partnership Project; Technical Specification Group Radio Access Network; Evolved Universal Terrestrial Radio Access (E-UTRA); Physical channels and modulation (Release 15)," 3GPP TS 36.211 V15.5.0, pp. 1-238, Generation Partnership Project, Valbonne, France (Mar. 2019).

"Enhancements for single UL operation for EN-DC," 3GPP TSG RAN WG1 Meeting #96bis, R1-1903994, Xi'an, China, Total 6 pages, 3rd Generation Partnership Project, Valbonne, France (Apr. 8-12, 2019).

"3rd Generation Partnership Project; Technical Specification Group Radio Access Network; Evolved Universal Terrestrial Radio Access (E-UTRA); Physical layer procedures (Release 15)," 3GPP TS 36.213 V15.5.0, pp. 1-552, 3rd Generation Partnership Project, Valbonne, France (Mar. 2019).

"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.4.0, pp. 1-933, 3rd Generation Partnership Project, Valbonne, France (Dec. 2018).

"Corrections on LTE-NR Coexistence," 3GPP TSG RAN WG1 Meeting #93, R1-1806742, Busan, Korea, XP051441944, Total 4 pages, 3rd Generation Partnership Project, Valbonne (May 21-25, 2018).

"RAN2 impact to support enhancements for dual UL and single UL operations in EN-DC," 3GPP TSG-RAN2 Meeting #109-e, R2-2001350, Electronic meeting, XP051849657, Total 7 pages, 3rd Generation Partnership Project, Valbonne (Feb. 24-Mar. 6, 2020).

"3rd Generation Partnership Project; Technical Specification Group Radio Access Network; Evolved Universal Terrestrial Radio Access (E-UTRA); Physical layer procedures (Release 15)," 3GPP TS 36.213 V15.1.0, pp. 1-7, 3rd Generation Partnership Project, Valbonne, France (Mar. 2018 [Retrieved on Apr. 3, 2018]).

"3rd Generation Partnership Project; Technical Specification Group Radio Access Network; Evolved Universal Terrestrial Radio Access (E-UTRA); Physical layer procedures (Release 15)," 3GPP TS 36.213 V15.1.0, pp. 57-334, 3rd Generation Partnership Project, Valbonne, France (Mar. 2018 [Retrieved on Apr. 3, 2018]).

EP/20783021.7, Office action, Jan. 25, 2024.

CN/201910253361.X, Office Action and Search Report, Jan. 27, 2024

"Corrections on LTE-NR Coexistence," 3GPP TSG RAN WG1 Meeting #93, R1-1806742, Busan, Korea, XP051441944, Total 4 pages, 3rd Generation Partnership Project, Valbonne, France (May 21-25, 2018).

"RAN2 impact to support enhancements for dual UL and single UL operations in EN-DC," 3GPP TSG-RAN Meeting #109-e, R2-2001350, Electronic meeting, XP051849657, Total 7 pages. 3rd Generation Partnership Project, Valnonnem France (Feb. 24-Mar. 6, 2020).

* cited by examiner

COMMUNICATION METHOD AND COMMUNICATIONS DEVICE

CROSS-REFERENCE TO RELATED APPLICATIONS

This application is a continuation of International Application No. PCT/CN2020/079065, filed on Mar. 12, 2020, which claims priority to Chinese Patent Application No. 201910253361.X, filed on Mar. 29, 2019. The disclosures of the aforementioned applications are hereby incorporated by reference in their entireties.

TECHNICAL FIELD

This application relates to the field of communications technologies, and in particular, to a communication method and a communications device.

BACKGROUND

In an LTE system, a terminal device supports simultaneous access to two network devices. Such an access mode is referred to as a dual connectivity (dual connectivity, DC) mode. One of the network devices is a primary network device, and the other network device is a secondary network device. In a development and evolution process of a wireless communications system, an operator deploys both a 5th generation mobile communications technology (the 5th generation, 5G) new radio interface (new radio interface, NR) system and a long term evolution (long term evolution, LTE) system. The terminal device also supports simultaneous access to a network device of the LTE system and a network device of the NR system.

A plurality of different types of uplink signals are defined in the LTE system and the NR system, including a physical uplink control channel (physical-layer uplink control channel, PUCCH), a physical uplink shared channel (physical-layer uplink shared channel, PUSCH), a physical random access channel (physical random access channel, PRACH), a sounding reference signal (sounding reference signal, SRS), and the like. However, regardless of the LTE system or the NR system, a timing at which the terminal device sends a PRACH is different from a timing at which the terminal device sends another signal.

In this case, if the terminal device needs to simultaneously send different types of signals to the network device of the NR system and the network device of the LTE system, for example, send a PUSCH to the network device of the LTE system and send a PRACH to the network device of the NR system, strong interference is caused between the signals sent by the terminal device.

SUMMARY

Embodiments of this application provide a communication method and a communications device, to reduce interference between signals.

According to a first aspect, a first communication method is provided. The method includes: determining a first signal to be sent on a first uplink carrier, and determining a second signal to be sent on a second uplink carrier, where the first uplink carrier corresponds to a first radio access technology, and the second uplink carrier corresponds to a second radio access technology; and when a first transmission timing corresponding to the first signal is different from a second transmission timing corresponding to the second signal or when a difference between the first transmission timing and the second transmission timing is greater than a preset value, and if the first signal and the second signal overlap in time domain, sending a third signal, where the third signal is the second signal sent on the second uplink carrier, or the third signal is the second signal sent on the second uplink carrier and a part of the first signal sent on the first uplink carrier, where the part of the first signal is carried on a symbol that does not overlap with a symbol corresponding to the second signal in time domain.

The method in the first aspect may be performed by a first communications apparatus. The first communications apparatus may be a communications device or a communications apparatus that can support a communications device in implementing a function required in the method, for example, a chip system. For example, the communications device is a terminal device.

Correspondingly, according to a second aspect, a second communication method is provided. In the method, a first network device determines a first time unit that is used by a terminal device to send a first signal, where the first network device corresponds to a first radio access technology.

The first network device sends first indication information to the terminal device, where the first indication information is used to indicate the first time unit, and the first time unit is used by the terminal device to send the first signal to the first network device.

The terminal device determines the first signal to be sent on a first uplink carrier, and determines a second signal to be sent on a second uplink carrier, where the first uplink carrier corresponds to the first radio access technology, and the second uplink carrier corresponds to a second radio access technology.

When a first transmission timing corresponding to the first signal is different from a second transmission timing corresponding to the second signal or when a difference between the first transmission timing and the second transmission timing is greater than a preset value, and if the first signal and the second signal overlap in time domain, the terminal device sends a third signal.

The third signal is the second signal sent on the second uplink carrier, or the third signal is the second signal sent on the second uplink carrier and a part of the first signal sent on the first uplink carrier, where the part of the first signal is carried on a symbol that does not overlap with a symbol corresponding to the second signal in time domain.

The method may be performed by the first communications apparatus described above and a second communications apparatus. The second communications apparatus may be a communications device or a communications apparatus that can support a communications device in implementing a function required in the method, for example, a chip system. For example, the communications device is the first network device.

In the methods in the first aspect and the second aspect, if the third signal is the second signal, the third signal is the second signal sent on the second uplink carrier. If the third signal is the second signal and the part of the first signal, where the part of the first signal is carried on the symbol that does not overlap with the symbol corresponding to the second signal in time domain, the third signal is the second signal sent on the second uplink carrier and the part of signal sent on the first uplink carrier.

According to a third aspect, a third communication method is provided. The method includes the following.

A second network device determines a second time unit used by a terminal device to send a second signal, where the second network device corresponds to a second radio access technology.

The second network device sends second indication information to the terminal device, where the second indication information is used to indicate the second time unit, and the second time unit is used by the terminal device to send the second signal to the second network device.

The terminal device determines a first signal to be sent on a first uplink carrier, and determines a second signal to be sent on a second uplink carrier, where the first uplink carrier corresponds to a first radio access technology, and the second uplink carrier corresponds to a second radio access technology.

When a first transmission timing corresponding to the first signal is different from a second transmission timing corresponding to the second signal or when a difference between the first transmission timing and the second transmission timing is greater than a preset value, and if the first signal and the second signal overlap in time domain, the terminal device sends a third signal.

The third signal is the second signal sent on the second uplink carrier, or the third signal is the second signal sent on the second uplink carrier and a part of the first signal sent on the first uplink carrier, where the part of the first signal is carried on a symbol that does not overlap with a symbol corresponding to the second signal in time domain.

The method may be performed by the first communications apparatus described above and a third communications apparatus. The third communications apparatus may be a communications device or a communications apparatus that can support a communications device in implementing a function required in the method, for example, a chip system. For example, the communications device is the second network device.

In this embodiment of this application, if determining that the transmission timing of the first signal is different from the transmission timing of the second signal or that the difference between the two transmission timings is greater than the preset value, and that the first signal and the second signal overlap in time domain, the terminal device may send the second signal, or may send the second signal and the part of the first signal, where the part of the first signal is carried on the symbol that does not overlap with the symbol corresponding to the second signal in time domain. It is equivalent that signals that are sent do not overlap in time domain, so that the two signals are sent in a time division mode, to reduce interference between the signals.

Optionally, the first radio access technology is NR, and the second radio access technology is LTE; or the first radio access technology is LTE, and the second radio access technology is NR. There is no specific limitation.

Optionally, the first signal is one of a PUCCH, a PUSCH, or an SRS, and the second signal is a PRACH.

If the first signal is one of a PUCCH, a PUSCH, or an SRS, and the second signal is a PRACH, the PRACH may be more important, or the PRACH generally needs to be sent in time. Therefore, the terminal device may choose to preferentially send the PRACH. Alternatively, the second signal is one of a PUCCH, a PUSCH, or an SRS, and the first signal is a PRACH. There is no specific limitation.

Optionally, a start moment of the first signal is later than a start moment of the second signal in time domain.

If the start moment of the second signal is earlier, the terminal device may preferentially send the second signal, so that a signal whose start moment is earlier can be sent in time as much as possible. Alternatively, the start moment of the second signal may be later than the start moment of the first signal in time domain. This is not specifically limited.

Optionally, the method further includes: The terminal device discards the first signal, or discards a part of the first signal, where the part of the first signal is carried on a symbol that overlaps with a symbol corresponding to the second signal in time domain.

"Discarding" described in this embodiment of this application may mean that the first signal or the part of signal is not sent on a current resource. For the signal that is not sent, the terminal device may alternatively store the signal. In this embodiment of this application, it is not limited that the signal needs to be discarded. Certainly, the terminal device may alternatively discard and does not store the first signal or the part of signal. This is applied to the following description, and details are not described again.

In addition to sending the third signal, the terminal device may further discard a remaining part of signal. Alternatively, the terminal device may not discard the remaining part of signal, but delay sending the remaining part of signal. There is no specific limitation.

Optionally, the method further includes: The terminal device receives first indication information from a first network device, where the first indication information is used to indicate the terminal device to send the first signal to the first network device.

For example, the first indication information may indicate a first time unit that is used to send the first signal, and the terminal device may determine a start moment of the first time unit based on an uplink timing advance of the first signal, that is, determine the first transmission timing. Alternatively, the first transmission timing may be preconfigured, and the terminal device does not need to determine the first transmission timing based on an uplink timing advance of the first signal.

Optionally, the method further includes: The terminal device receives second indication information from a second network device, where the second indication information is used to indicate the terminal device to send the second signal to the second network device.

For example, the second indication information may indicate a second time unit that is used to send the second signal, and the terminal device may determine a start moment of the second time unit based on an uplink timing advance of the second signal, that is, determine the second transmission timing. Alternatively, the second transmission timing may be preconfigured, and the terminal device does not need to determine the second transmission timing based on an uplink timing advance of the second signal.

According to a fourth aspect, a fourth communication method is provided. The method includes: receiving first indication information from a first network device, where the first indication information indicates a TDD configuration, the TDD configuration is used to indicate at least one first uplink time unit and at least one downlink time unit in a time domain unit, the time domain unit includes N time units, and N is an integer greater than 1; receiving, by a terminal device, second indication information from the first network device, where the second indication information indicates a reference TDD configuration and an offset, the reference TDD configuration indicates k second uplink time units in the N time units, k is an integer greater than or equal to 1 and less than N, a value of the offset belongs to a value range, the value range includes a part of or all of 0, 1, 2, 5, 6, or 7 and does not include 3, 4, 8, or 9; and sending a first uplink signal to the first network device in a third uplink time unit based on the reference TDD configuration and the offset, where the third uplink time unit is one or more of the at least one first uplink time unit.

The method may be performed by a fourth communications apparatus. The fourth communications apparatus may be a communications device or a communications apparatus that can support a communications device in implementing a function required in the method, for example, a chip system. For example, the fourth communications apparatus is a terminal device.

According to a fifth aspect, a fifth communication method is provided. The method includes: sending first indication information to a terminal device, where the first indication information indicates a TDD configuration, the TDD configuration is used to indicate at least one first uplink time unit and at least one downlink time unit in a time domain unit, the time domain unit includes N time units, and N is an integer greater than 1; sending, by a first network device, second indication information to the terminal device, where the second indication information indicates a reference TDD configuration and an offset, the reference TDD configuration indicates k second uplink time units in the N time units, k is an integer greater than or equal to 1 and less than N, a value of the offset belongs to a value range, the value range includes a part of or all of 0, 1, 2, 5, 6, or 7 and does not include 3, 4, 8, or 9; and receiving a first uplink signal from the terminal device in a third uplink time unit based on the reference TDD configuration and the offset, where the third uplink time unit is one or more of the at least one first uplink time unit.

The method may be performed by a fifth communications apparatus. The fifth communications apparatus may be a communications device or a communications apparatus that can support a communications device in implementing a function required in the method, for example, a chip system. For example, the fifth communications apparatus is a first network device.

In the methods in the fourth aspect and the fifth aspect, the first network device may configure offsets for a part of terminal devices, and does not configure offsets for another part of terminal devices. Values of the offsets configured for the part of terminal devices may be different. In this manner, different terminal devices may send uplink signals in different uplink time units, so that each uplink time unit is utilized as much as possible, and network resource utilization is improved. In addition, by configuring an offset, flexibility of the reference TDD configuration is also improved.

Optionally, numbers of the k second uplink time units in the N time units indicated by the reference TDD configuration are $n_1, n_2, \ldots,$ and $n_k$, and a value of the offset is i; and the third uplink time unit is one or more of time units whose numbers are $n_1+i, n_2+i, \ldots,$ and $n_k+i$ in the time domain unit, or one or more of time units whose numbers are $\mod(n_1+i, N), \mod(n_2+i, N), \ldots,$ and $\mod(n_k+i, N)$ in the time domain unit.

The manner in which the terminal device determines the third uplink time unit based on the reference TDD configuration and the offset. Certainly, in this embodiment of this application, the manner in which the terminal device determines the third uplink time unit based on the reference TDD configuration and the offset is not limited thereto.

Optionally, the value range is {0, 1}, {0, 1, 5, 6}, {0, 5}, {0, 1, 2}, {0, 1, 2, 5, 6, 7}, {0, 1, 5}, or {0, 1, 2, 5, 6}.

In this embodiment of this application, in addition to one or more of the several value ranges, another value range may be further included. The several value ranges may alternatively include only a part of the values, or include all of the values. In addition, the value range may actually exist, and one value range may include one or more values. Alternatively, the concept of the value range may not exist, and the value range is merely an umbrella term for a plurality of values.

Optionally, the value range includes at least one or any combination of the following:
when the TDD configuration is a TDD configuration 0, the value range is {0, 1, 2, 5, 6, 7};
when the TDD configuration is a TDD configuration 1, the value range is {0, 1, 5, 6};
when the TDD configuration is a TDD configuration 2, the value range is {0, 5};
when the TDD configuration is a TDD configuration 3, the value range is {0, 1, 2};
when the TDD configuration is a TDD configuration 4, the value range is {0, 1}; or
when the TDD configuration is a TDD configuration 6, the value range is {0, 1, 2, 5, 6}.

If the value range is determined based on the TDD configuration, the determined value range may include at least one of the foregoing items.

Optionally, the value range includes at least one or any combination of the following:
when the reference TDD configuration is the TDD configuration 2, the value range is {0, 1, 2, 5, 6, 7} or {0, 1, 2, 5, 6};
when the reference TDD configuration is the TDD configuration 4, the value range is {0, 1, 5, 6} or {0, 1, 5}; or
when the reference TDD configuration is a TDD configuration 5, the value range is {0, 1, 2, 5, 6, 7} or {0, 1, 2, 5, 6}.

If the value range is determined based on the reference TDD configuration, the determined value range may include at least one of the foregoing items.

Optionally, the method further includes: The first network device determines the value range based on the TDD configuration and/or the reference TDD configuration.

The first network device may determine the value range based on the TDD configuration or the reference TDD configuration, or determine the value range based on the TDD configuration and the reference TDD configuration. After the value range is determined, a value of the offset may be selected from the determined value range and sent to the terminal device.

According to a sixth aspect, a first type of communications apparatus is provided. The communications apparatus is, for example, the first communications apparatus described above. The communications apparatus includes a processor and a memory. Optionally, the communications apparatus may further include a transceiver. The processor, the memory, and the transceiver may be configured to implement the method described in any of the first aspect or the possible designs of the first aspect. For example, the communications apparatus is a chip disposed in a communications device. For example, the communications device is a terminal device. The transceiver is implemented by, for example, an antenna, a feeder, a codec, and the like in the communications device. Alternatively, if the communications apparatus is the chip disposed in the communications device, the transceiver is, for example, a communications interface in the chip, and the communications interface is connected to a radio frequency transceiver component in the communications device, to implement information sending and receiving through the radio frequency transceiver component.

The processor is configured to determine a first signal to be sent on a first uplink carrier, and determine a second signal to be sent on a second uplink carrier, where the first uplink carrier corresponds to a first radio access technology, and the second uplink carrier corresponds to a second radio access technology.

The transceiver is configured to: when a first transmission timing corresponding to the first signal is different from a second transmission timing corresponding to the second signal or when a difference between the first transmission timing and the second transmission timing is greater than a preset value, and if the first signal and the second signal overlap in time domain, send a third signal.

The third signal is the second signal sent on the second uplink carrier, or the third signal is the second signal sent on the second uplink carrier and a part of the first signal sent on the first uplink carrier, where the part of the first signal is carried on a symbol that does not overlap with a symbol corresponding to the second signal in time domain.

For an optional solution in the sixth aspect, refer to the foregoing description. Details are not described herein again.

Optionally, the processor is further configured to discard the first signal, or discard a part of the first signal, where the part of the first signal is carried on a symbol that overlaps with a symbol corresponding to the second signal in time domain.

Optionally, the transceiver is further configured to receive first indication information from a first network device, where the first indication information is used to indicate the terminal device to send the first signal to the first network device.

Optionally, the transceiver is further configured to receive second indication information from the second network device, where the second indication information is used to indicate the terminal device to send the second signal to the second network device.

For technical effects brought by the sixth aspect or the implementations of the sixth aspect, refer to the description of the technical effects of the first aspect or the implementations of the first aspect. Details are not described again.

According to a seventh aspect, a first type of communications system is provided. The communications system includes, for example, the first type of communications apparatus described above and a second type of communications apparatus. The second type of communications apparatus is, for example, the second communications apparatus described above.

According to an eighth aspect, a second type of communications system is provided. The communications system includes, for example, the first type of communications apparatus described above and a third type of communications apparatus. The third type of communications apparatus is, for example, the third communications apparatus described above.

According to a ninth aspect, a fourth type of communications apparatus is provided. The communications apparatus is, for example, the fourth communications apparatus described above. The communications apparatus includes a processor and a memory. Optionally, the communications apparatus may further include a transceiver. The processor, the memory, and the transceiver may be configured to implement the method described in any one of the fourth aspect or the possible designs of the fourth aspect. For example, the communications apparatus is a chip disposed in a communications device. For example, the communications device is a terminal device. The transceiver is implemented by, for example, an antenna, a feeder, a codec, and the like in the communications device. Alternatively, if the communications apparatus is the chip disposed in the communications device, the transceiver is, for example, a communications interface in the chip, and the communications interface is connected to a radio frequency transceiver component in the communications device, to implement information sending and receiving through the radio frequency transceiver component.

The transceiver is configured to: receive first indication information from a first network device, and receive second indication information from the first network device, where the first indication information indicates a TDD configuration, the TDD configuration is used to indicate at least one first uplink time unit and at least one downlink time unit in a time domain unit, the time domain unit includes N time units, N is an integer greater than 1, the second indication information indicates a reference TDD configuration and an offset, the reference TDD configuration indicates k second uplink time units in the N time units, k is an integer greater than or equal to 1 and less than N, a value of the offset belongs to a value range, and the value range includes a part of or all of 0, 1, 2, 5, 6, or 7 and does not include 3, 4, 8, or 9.

The processor is configured to determine a third uplink time unit based on the reference TDD configuration and the offset, where the third uplink time unit is one or more of the at least one first uplink time unit.

The transceiver is further configured to send a first uplink signal to the first network device in the third uplink time unit.

For an optional solution in the ninth aspect, refer to the foregoing description. Details are not described herein again.

For technical effects brought by the ninth aspect or the implementations of the ninth aspect, refer to the description of the technical effects of the fourth aspect or the implementations of the fourth aspect. Details are not described again.

According to a tenth aspect, a fifth type of communications apparatus is provided. The communications apparatus is, for example, the fifth communications apparatus described above. The communications apparatus includes a processor and a memory. Optionally, the communications apparatus may further include a transceiver. The processor, the memory, and the transceiver may be configured to implement the method described in the fifth aspect or the possible designs of the fifth aspect. For example, the communications apparatus is a chip disposed in a communications device. For example, the communications device is a first network device. The transceiver is implemented by, for example, an antenna, a feeder, a codec, and the like in the communications device. Alternatively, if the communications apparatus is the chip disposed in the communications device, the transceiver is, for example, a communications interface in the chip, and the communications interface is connected to a radio frequency transceiver component in the communications device, to implement information sending and receiving through the radio frequency transceiver component.

The transceiver is configured to: send first indication information to a terminal device, and send second indication information to the terminal device, where the first indication information indicates a TDD configuration, the TDD configuration is used to indicate at least one first uplink time unit and at least one downlink time unit in a time domain unit, the time domain unit includes N time units, N is an integer greater than 1, the second indication information indicates a reference TDD configuration and an offset, the reference TDD configuration indicates k second uplink time units in the N time units, k is an integer greater than or equal to 1 and less than N, a value of the offset belongs to a value range, and the value range includes a part of or all of 0, 1, 2, 5, 6, or 7 and does not include 3, 4, 8, or 9.

The processor is configured to determine a third uplink time unit based on the reference TDD configuration and the offset, where the third uplink time unit is one or more of the at least one first uplink time unit.

The transceiver is further configured to receive a first uplink signal from the terminal device in the third uplink time unit.

For an optional solution in the tenth aspect, refer to the foregoing description. Details are not described herein again.

For technical effects brought by the tenth aspect or the implementations of the tenth aspect, refer to the description of the technical effects of the fifth aspect or the implementations of the fifth aspect. Details are not described again.

According to an eleventh aspect, a sixth type of communications apparatus is provided. The communications apparatus is, for example, the first communications apparatus described above. The communications apparatus is configured to perform the method in any one of the first aspect or the possible implementations of the first aspect. Specifically, the communications apparatus may include modules configured to perform the method in any one of the first aspect or the possible implementations of the first aspect, for example, include a processing module and a storage module that are coupled to each other, and optionally, further include a transceiver module. For example, the communications apparatus is a communications device. For example, the communications device is a terminal device. The transceiver module is configured to implement receiving and sending actions in the first aspect, and the processing module is configured to implement an action other than the receiving and sending actions in the first aspect.

For an optional solution in the eleventh aspect, refer to the foregoing description. Details are not described herein again.

For technical effects brought by the eleventh aspect or the implementations of the eleventh aspect, refer to the description of the technical effects of the fifth aspect or the implementations of the fifth aspect. Details are not described again.

According to a twelfth aspect, a third type of communications system is provided. The communications system includes, for example, the sixth type of communications apparatus described above and a seventh type of communications apparatus. The seventh type of communications apparatus is, for example, the second communications apparatus described above.

According to a thirteenth aspect, a fourth type of communications system is provided. The communications system includes, for example, the sixth type of communications apparatus described above, and an eighth type of communications apparatus. The eighth type of communications apparatus is, for example, the third communications apparatus described above.

According to a fourteenth aspect, a ninth type of communications apparatus is provided. The communications apparatus is, for example, the fourth communications apparatus described above. The communications apparatus is configured to perform the method in any one of the fourth aspect or the possible implementations of the fourth aspect. Specifically, the communications apparatus may include modules configured to perform the method in any one of the fourth aspect or the possible implementations of the fourth aspect, for example, include a processing module and a storage module that are coupled to each other, and optionally, further include a transceiver module. For example, the communications apparatus is a communications device. For example, the communications device is a terminal device. The transceiver module is configured to implement receiving and sending actions in the fourth aspect, and the processing module is configured to implement an action other than the receiving and sending actions in the fourth aspect.

According to a fifteenth aspect, a tenth type of communications apparatus is provided. The communications apparatus is, for example, the fifth communications apparatus described above. The communications apparatus is configured to perform the method in any one of the fifth aspect or the possible implementations of the fifth aspect. Specifically, the communications apparatus may include modules configured to perform the method in any one of the fifth aspect or the possible implementations of the fifth aspect, for example, include a processing module and a storage module that are coupled to each other, and optionally, further include a transceiver module. For example, the communications apparatus is a communications device. For example, the communications device is a first network device. The transceiver module is configured to implement receiving and sending actions in the fifth aspect, and the processing module is configured to implement an action other than the receiving and sending actions in the fifth aspect.

According to a sixteenth aspect, an eleventh type of communications apparatus is provided. The communications apparatus may be the first communications apparatus in the foregoing method designs. For example, the communications apparatus is a chip disposed in a communications device. For example, the communications device is a terminal device. The communications apparatus includes: a memory, configured to store computer executable program code; and a processor, where the processor is coupled to the memory. The program code stored in the memory includes an instruction. When the processor executes the instruction, the eleventh type of communications apparatus is enabled to perform the method in any one of the first aspect or the possible implementations of the first aspect, or perform the method in any one of the second aspect or the possible implementations of the second aspect, perform the method in any one of the third aspect or the possible implementations of the third aspect.

The eleventh type of communications apparatus may further include a communications interface. The communications interface may be a transceiver in a terminal device. For example, the communications interface is implemented by an antenna, a feeder, a codec, and the like in the communications apparatus. Alternatively, if the eleventh type of communications apparatus is a chip disposed in the terminal device, the communications interface may be an input/output interface of the chip, for example, an input/output pin.

According to a seventeenth aspect, a twelfth type of communications apparatus is provided. The communications apparatus may be the second communications apparatus in the foregoing method designs. For example, the communications apparatus is a chip disposed in a communications device. For example, the communications device is a first network device. The communications apparatus includes: a memory, configured to store computer executable program code; and a processor, where the processor is coupled to the memory. The program code stored in the memory includes an instruction. When the processor executes the instruction, the twelfth type of communications apparatus is enabled to perform the method in any one of the second aspect or the possible implementations of the second aspect.

The twelfth type of communications apparatus may further include a communications interface. The communications interface may be a transceiver in the first network device. For example, the communications interface is implemented by an antenna, a feeder, a codec, and the like in the communications apparatus. Alternatively, if the twelfth type of communications apparatus is a chip disposed in the first network device, the communications interface may be an input/output interface of the chip, for example, an input/output pin.

According to an eighteenth aspect, a thirteenth type of communications apparatus is provided. The communications apparatus may be the third communications apparatus in the foregoing method designs. For example, the communications apparatus is a chip disposed in a communications device. For example, the communications device is a second network device. The communications apparatus includes: a memory, configured to store computer executable program code; and a processor, where the processor is coupled to the memory. The program code stored in the memory includes an instruction. When the processor executes the instruction, the thirteenth type of communications apparatus is enabled to perform the method in any one of the third aspect or the possible implementations of the third aspect.

The thirteenth type of communications apparatus may further include a communications interface. The communications interface may be a transceiver in the second network device. For example, the communications interface is implemented by an antenna, a feeder, a codec, and the like in the communications apparatus. Alternatively, if the thirteenth type of communications apparatus is a chip disposed in the second network device, the communications interface may be an input/output interface of the chip, for example, an input/output pin.

According to a nineteenth aspect, a fourteenth type of communications apparatus is provided. The communications apparatus may be the fourth communications apparatus in the foregoing method designs. For example, the communications apparatus is a chip disposed in a communications device. For example, the communications device is a terminal device. The communications apparatus includes: a memory, configured to store computer executable program code; and a processor, where the processor is coupled to the memory. The program code stored in the memory includes an instruction. When the processor executes the instruction, the nineteenth type of communications apparatus is enabled to perform the method in any one of the fourth aspect or the possible implementations of the fourth aspect.

The nineteenth type of communications apparatus may further include a communications interface. The communications interface may be a transceiver in the terminal device. For example, the communications interface is implemented by an antenna, a feeder, a codec, and the like in the communications apparatus. Alternatively, if the nineteenth type of communications apparatus is a chip disposed in the terminal device, the communications interface may be an input/output interface of the chip, for example, an input/output pin.

According to a twentieth aspect, a fifteenth type of communications apparatus is provided. The communications apparatus may be the fifth communications apparatus in the foregoing method designs. For example, the communications apparatus is a chip disposed in a communications device. For example, the communications device is a second network device. The communications apparatus includes: a memory, configured to store computer executable program code; and a processor, where the processor is coupled to the memory. The program code stored in the memory includes an instruction. When the processor executes the instruction, the twentieth type of communications apparatus is enabled to perform the method in any one of the fifth aspect or the possible implementations of the fifth aspect.

The twentieth type of communications apparatus may further include a communications interface. The communications interface may be a transceiver in the second network device. For example, the communications interface is implemented by an antenna, a feeder, a codec, and the like in the communications apparatus. Alternatively, if the twentieth type of communications apparatus is a chip disposed in the second network device, the communications interface may be an input/output interface of the chip, for example, an input/output pin.

According to a twenty-first aspect, a fourth type of communications system is provided. The communications system may include the fourth type of communications apparatus according to the ninth aspect, the ninth type of communications apparatus according to the fourteenth aspect, or the fourteenth type of communications apparatus according to the nineteenth aspect; and include the fifth type of communications apparatus according to the tenth aspect, the tenth type of communications apparatus according to the fifteenth aspect, or the fifteenth type of communications apparatus according to the twentieth aspect.

According to a twenty-second aspect, a computer readable storage medium is provided. The computer readable storage medium stores an instruction. When the instruction is run on a computer, the computer is enabled to perform the method in any one of the first aspect or the possible designs of the first aspect.

According to a twenty-third aspect, a computer readable storage medium is provided. The computer readable storage medium stores an instruction. When the instruction is run on a computer, the computer is enabled to perform the method in any one of the second aspect or the possible designs of the second aspect.

According to a twenty-fourth aspect, a computer readable storage medium is provided. The computer readable storage medium stores an instruction. When the instruction is run on a computer, the computer is enabled to perform the method in any one of the third aspect or the possible designs of the third aspect.

According to a twenty-fifth aspect, a computer readable storage medium is provided. The computer readable storage medium stores an instruction. When the instruction is run on a computer, the computer is enabled to perform the method in any one of the fourth aspect or the possible designs of the fourth aspect.

According to a twenty-sixth aspect, a computer readable storage medium is provided. The computer readable storage medium stores an instruction. When the instruction is run on a computer, the computer is enabled to perform the method in any one of the fifth aspect or the possible designs of the fifth aspect.

According to a twenty-seventh aspect, a computer program product including an instruction is provided. The computer program product stores the instruction. When the computer program product runs on a computer, the computer is enabled to perform the method in any one of the first aspect or the possible designs of the first aspect.

According to a twenty-eighth aspect, a computer program product including an instruction is provided. The computer program product stores the instruction. When the computer program product runs on a computer, the computer is enabled to perform the method in any one of the second aspect or the possible designs of the second aspect.

According to a twenty-ninth aspect, a computer program product including an instruction is provided. The computer program product stores the instruction. When the computer program product runs on a computer, the computer is enabled to perform the method in any one of the third aspect or the possible designs of the third aspect.

According to a thirtieth aspect, a computer program product including an instruction is provided. The computer program product stores the instruction. When the computer program product runs on a computer, the computer is enabled to perform the method in any one of the fourth aspect or the possible designs of the fourth aspect.

According to a thirty-first aspect, a computer program product including an instruction is provided. The computer program product stores the instruction. When the computer program product runs on a computer, the computer is enabled to perform the method in any one of the fifth aspect or the possible designs of the fifth aspect.

According to the embodiments of this application, signals that are sent do not overlap in time domain, so that the two signals are sent in a time division mode, to reduce interference between the signals.

DESCRIPTION OF EMBODIMENTS

Figure 1:
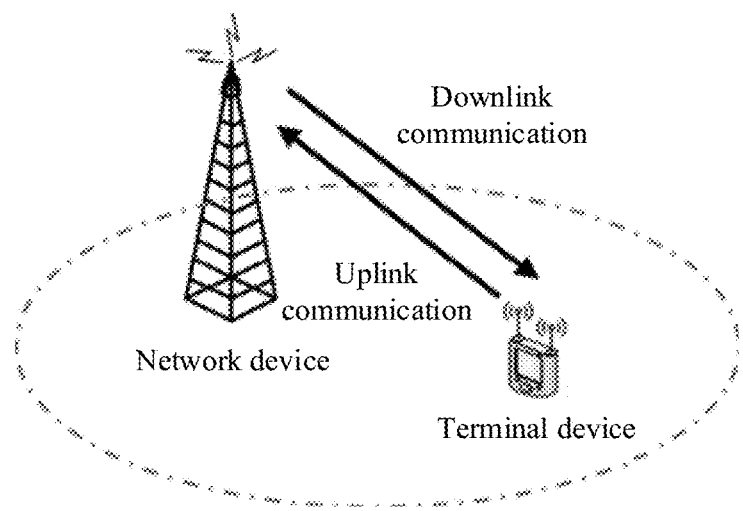
FIG. 1 to FIG. 4 are schematic diagrams of four application scenarios according to an embodiment of this application.

To make objectives, technical solutions and advantages of embodiments of this application clearer, the following further describes the embodiments of this application in detail with reference to the accompanying drawings.

The following describes some terms in the embodiments of this application, to facilitate understanding of a person skilled in the art.

(1) Terminal device: A terminal device is a device that provides a user with voice and/or data connectivity, for example, may be a handheld device with a wireless connection function, or a processing device connected to a wireless modem. The terminal device may communicate with a core network through a radio access network (radio access network, RAN), and exchange voice and/or data with the RAN. The terminal device may be user equipment (user equipment, UE), a wireless terminal device, a mobile terminal device, a device-to-device (device-to-device, D2D) terminal device, a vehicle-to-everything (vehicle-to-everything, V2X) terminal device, a machine-to-machine/machine type communication (machine-to-machine/machine-type communications, M2M/MTC) terminal device, an internet of things (internet of things, IoT) terminal device, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal device may be a mobile phone (or referred to as a "cellular" phone), a computer with a mobile terminal device, a portable, pocket-sized, handheld, or computer built-in mobile apparatus, or the like. For example, the terminal device is a device such as a personal communication service (personal communication service, PCS) phone, a cordless phone, a session initiation protocol (session initiation protocol, SIP) phone, a wireless local loop (wireless local loop, WLL) station, or a personal digital assistant (personal digital assistant, PDA). The terminal device further includes a limited device, for example, a device with comparatively low power consumption, a device with a limited storage capability, or a device with a limited computing capability. For example, the terminal device includes an information sensing device such as a bar code device, a radio frequency identification (radio frequency identification, RFID) device, a sensor, a global positioning system (global positioning system, GPS), or a laser scanner.

By way of example but not limitation, in the embodiments of this application, the terminal device may be alternatively a wearable device. The wearable device may also be referred to as a wearable intelligent device, an intelligent wearable device, or the like. The wearable device is an umbrella term for devices that are developed by applying a wearable technology to perform intelligent design on daily wear, for example, glasses, gloves, a watch, clothes, and shoes. The wearable device is a portable device that is directly worn on the body or that is integrated into clothes or an accessory of a user. The wearable device is more than a hardware device, and implements powerful functions through software support, data exchange, and cloud interaction. In a broad sense, wearable intelligent devices include full-featured and large-sized devices that can implement all or some functions without depending on smartphones, for example, smart watches or smart glasses, and devices that focus on only one type of application function and need to work with another device such as a smartphone, for example, various smart bands, smart helmets, or smart jewelry for monitoring physical signs.

However, if the various terminal devices described above are located on a vehicle (for example, placed in the vehicle or installed in the vehicle), the terminal devices may be considered as in-vehicle terminal devices. The in-vehicle terminal devices are, for example, also referred to as on-board units (on-board unit, OBU).

(2) Network device: A network device includes, for example, an access network (access network, AN) device such as a base station (for example, an access point), and may be a device that communicates with a wireless terminal device over an air interface through one or more cells in an access network. Alternatively, for example, a network device in a V2X technology is a road side unit (road side unit, RSU). The base station may be configured to perform mutual conversion between a received over-the-air frame and a received internet protocol (IP) packet, and serve as a router between the terminal device and a remaining part of the access network, where the remaining part of the access network may include an IP network. The RSU may be a fixed infrastructure entity that supports a vehicle-to-everything (vehicle-to-everything, V2X) application, and may exchange a message with another entity that supports the V2X application. The access network device may further coordinate attribute management of an air interface. For example, the access network device may include an evolved NodeB (NodeB, eNB, or e-NodeB, evolutional Node B) in an LTE system or a long term evolution-advanced (long term evolution-advanced, LTE-A) system; or may include a next-generation NodeB (next generation node B, gNB) in a 5G NR system; or may include a centralized unit (centralized unit, CU) and a distributed unit (distributed unit, DU) in a cloud access network (cloud radio access network, Cloud RAN) system. This is not limited in the embodiments of this application.

Certainly, the network device may further include a core network device. However, the technical solutions provided in the embodiments of this application mainly relate to the access network device. Therefore, unless otherwise specified, a "network device" described below is an access network device.

(3) Multi radio access technology dual connectivity (multi-RAT dual connectivity, MR-DC)

In an LTE system, a terminal device supports simultaneous access to two network devices. Such an access mode is referred to as a dual connectivity (dual connectivity, DC) mode. One of the network devices is a primary network device, and the other network device is a secondary network device. In a development and evolution process of a wireless communications system, an operator deploys both a 5G NR system and the LTE system, and the terminal device also supports simultaneous access to an LTE network device and an NR network device. Because LTE is also referred to as evolved universal terrestrial radio access (evolved universal terrestrial radio access, E-UTRA), such an access mode is referred to as an evolved universal terrestrial radio access and new radio interface dual connectivity (E-UTRA NR dual connectivity, EN-DC) mode. In the EN-DC mode, the LTE network device is a primary network device, and the NR network device is a secondary network device. Certainly, with evolution of the system, new air interface and evolved universal terrestrial radio access network dual connectivity (NR E-UTRA dual connectivity, NE-DC) may also be supported in the future, that is, the NR network device is a primary network device, the LTE network device is a secondary network device. Because both an EN-DC terminal device and an NE-DC terminal device are connected to network devices of two different radio access technologies, these DC modes may also be collectively referred to as an MR-DC mode.

(4) Subcarrier: In an orthogonal frequency division multiplexing (orthogonal frequency division multiplexing, OFDM) system, a frequency domain resource is divided into several subresources, and each subresource in frequency domain may be referred to as a subcarrier. The subcarrier may also be understood as a smallest granularity of a frequency domain resource.

(5) Subcarrier spacing: A subcarrier spacing is a value of a spacing between center positions or peak positions of two adjacent subcarriers in frequency domain in an OFDM system. For example, a subcarrier spacing in an LTE system is 15 kHz, and a subcarrier spacing in a 5G NR system may be 15 kHz, 30 kHz, 60 kHz, 120 kHz, or the like.

(6) Resource block (resource block, RB): N consecutive subcarriers in frequency domain may be referred to as one resource block. For example, one resource block in an LTE system includes 12 subcarriers, and one resource block in a 5G NR system also includes 12 subcarriers. With evolution of the communications system, one resource block may alternatively include subcarriers of another quantity.

(7) Slot (slot): One slot in an NR system includes 14 OFDM symbols. For example, a slot length corresponding to a 15-kHz subcarrier spacing is 1 ms, and a slot length corresponding to a 30-kHz subcarrier spacing is 0.5 ms.

(8) A subframe (subframe): A time length of one subframe in an NR system is 1 ms.

(9) OFDM symbol: An OFDM symbol is a smallest time unit in time domain in an OFDM system. In this specification, the OFDM symbol is also briefly referred to as a symbol.

(10) Time-frequency resource unit: A time-frequency resource unit is a minimum resource granularity in an OFDM system. The time-frequency resource unit is an OFDM symbol in time domain, and the time-frequency resource unit is a subcarrier in frequency domain.

(11) "At least one" means one or more, and "a plurality of" means two or more than two. The term "and/or" describes an association relationship for describing associated objects and represents that three relationships may exist. For example, A and/or B may represent the following cases: Only A exists, both A and B exist, and only B exists, where A and B may be singular or plural. The character "/" generally represents an "or" relationship between the associated objects. "At least one item (piece) of the following" or a similar expression thereof means any combination of these items, including a singular item (piece) or any combination of plural items (pieces). For example, at least one of a, b, or c may indicate: a, b, c, a-b, a-c, b-c, or a-b-c, where a, b, and c may be singular or plural.

In addition, unless otherwise specified, ordinal numbers such as "first" and "second" in the embodiments of this application are used to distinguish between a plurality of objects, but are not intended to limit a sequence, a time sequence, priorities, or importance of the plurality of objects. For example, first information and second information are merely intended to distinguish between different signaling, but do not indicate that the two types of information are different in content, priorities, sending sequences, importance, or the like.

The foregoing describes some concepts in the embodiments of this application. The following describes technical features in the embodiments of this application.

For a wireless communications system, there may be mainly a frequency division duplex (frequency division duplex, FDD) mode and a time division duplex (time division duplex, TDD) mode based on different duplex modes. For a wireless communications system working in the TDD mode, the system usually includes only one working frequency band. Therefore, the frequency band is also referred to as an unpaired frequency band. For the system using the unpaired frequency band, within a period of time, in an area served by one network device, an entire working frequency band is used only for downlink communication or only for uplink communication. For a wireless communications system working in an FDD mode, the system usually includes one pair of frequency bands for communication. One frequency band is used for downlink communication from a network device to a terminal device, and the other frequency band is used for uplink communication from the terminal device to the network device.

Currently, a typical deployment mode is an intra-band (intra-band) MR-DC mode. An NR network and an LTE network are deployed in a same frequency band, and both work in a TDD mode.

For a terminal device working in the MR-DC mode, moments at which the terminal device sends signals may belong to a same timing adjustment group on an LTE side and an NR side. In other words, a transmission timing at which the terminal device sends an LTE signal to the LTE network device is the same as a transmission timing at which the terminal device sends an NR signal to the NR network device.

A "timing" may be understood as a start moment at which a sending device sends a signal (or an end moment at which the sending device sends a signal), or a start moment at which a receiving device receives a signal (or an end moment at which the receiving device receives a signal). For ease of description, the following uses a radio frame as an example. Certainly, a time unit may be another type of time unit such as a slot or a symbol. The timing used for signal transmission may be generally understood as an absolute moment. When sending an uplink signal, the terminal device needs to determine, based on a received synchronization signal, a start moment of a radio frame used for downlink receiving. The start moment of the radio frame used for downlink receiving may be used as a time reference point, and further the terminal device may determine, based on the start moment of the radio frame used for downlink receiving, a start moment of the radio frame used for uplink sending. In this case, the start moment of the radio frame used for uplink sending may be considered as a timing (which may also be referred to as a transmission timing), and the timing is an absolute moment. Then, the terminal device sends an uplink signal based on the timing.

It should be understood that, the timing may be understood as a time point. In other words, one timing may include at least one time point (or include at least one moment). For example, the at least one moment includes at least three moments that may be equally spaced. For example, the start moment of the radio frame used by the terminal device for downlink receiving is used as a reference moment, and is denoted as 0 milliseconds (millisecond, ms). A length of one radio frame is 10 ms. Timings of the radio frame used by the terminal device for downlink receiving may include 0 ms, 10 ms, 20 ms, . . . , and the like. In other words, the terminal device may receive a downlink signal at each of all or some of the plurality of time points, such as 0 ms, 10 ms, 20 ms, and the like. The start moment of the radio frame used by the terminal device for uplink sending may be (x) ms earlier than the start moment of the radio frame used for downlink receiving. The timing used by the terminal device for uplink sending may include a plurality of moments such as (0-x) ms, (10-x) ms, and (20-x) ms. Certainly, the at least one moment may not be equally spaced. This is not limited herein.

A timing advance (timing advance, TA) may be understood from a perspective of a relative moment. A timing specified in a communications protocol is a relative moment. Generally, a time reference point (the time reference point may be a start moment that is of a radio frame used for downlink receiving and that is determined based on a synchronization signal) is defined in a communications protocol, and there is usually an offset between the timing in the communications protocol and the time reference point. A timing advance corresponding to an uplink signal may also be referred to as an uplink timing advance.

The uplink signal may include a PUCCH, a PUSCH, a PRACH, an SRS, or the like. In terms of classification, the PUCCH, the PUSCH, the SRS, and the like may belong to one type, and are referred to as, for example, a first-type signal; and the PRACH may belong to another type, and is referred to as, for example, a second-type signal. The time reference point is the same for all the types of signals in the LTE system. However, the first-type signal and the second-type signal each have a specified uplink timing advance in the LTE system. For example, the uplink timing advance of the first-type signal is generally greater than 0, and the uplink timing advance of the second-type signal is generally equal to 0. Therefore, transmission timings of the first-type signal and the second-type signal are different in the LTE system. A transmission timing in the NR system is generally the same as a transmission timing in the LTE system as much as possible. For example, the transmission timing of the first-type signal in the NR system is the same as the transmission timing of the first-type signal in the LTE system, and the transmission timing of the second-type signal in the NR system is the same as the transmission timing of the second-type signal in the LTE system. Therefore, the transmission timings of the first-type signal and the second-type signal are also different in the NR system.

Therefore, if the terminal device needs to simultaneously send the first-type signal to a network device in the NR system and the second-type signal to a network device in the LTE system, or the terminal device needs to simultaneously send the second-type signal to a network device in the NR system and the first-type signal to a network device in the LTE system, but transmission timings of the two types of signals are different, strong interference is caused between signals that are sent by the terminal device.

In view of this, technical solutions in the embodiments of this application are provided. In the embodiments of this application, if determining that a transmission timing of a first signal is different from a transmission timing of a second signal or that a difference between two transmission timings is greater than a preset value, and that a first signal and a second signal overlap in time domain, a terminal device may send the second signal, or may send the second signal and a part of the first signal, where the part of the first signal is carried on a symbol that does not overlap with a symbol corresponding the second signal in time domain. It is equivalent that signals that are sent do not overlap in time domain, so that the two signals are sent in a time division mode, to reduce interference between the signals.

Figure 2:
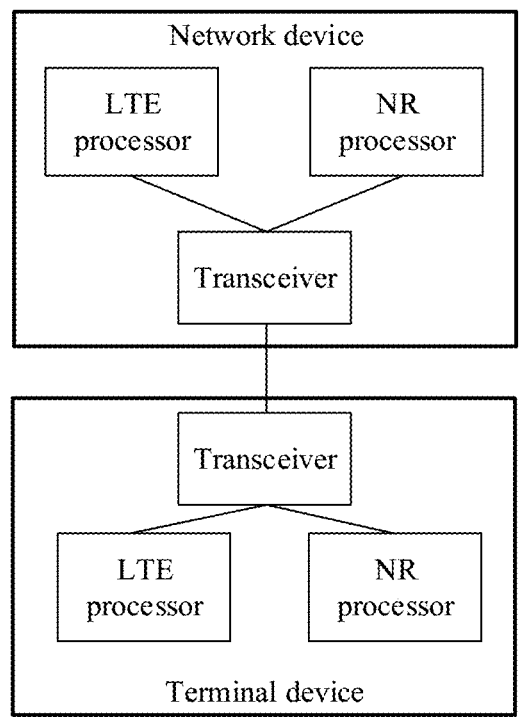
Figure 3:
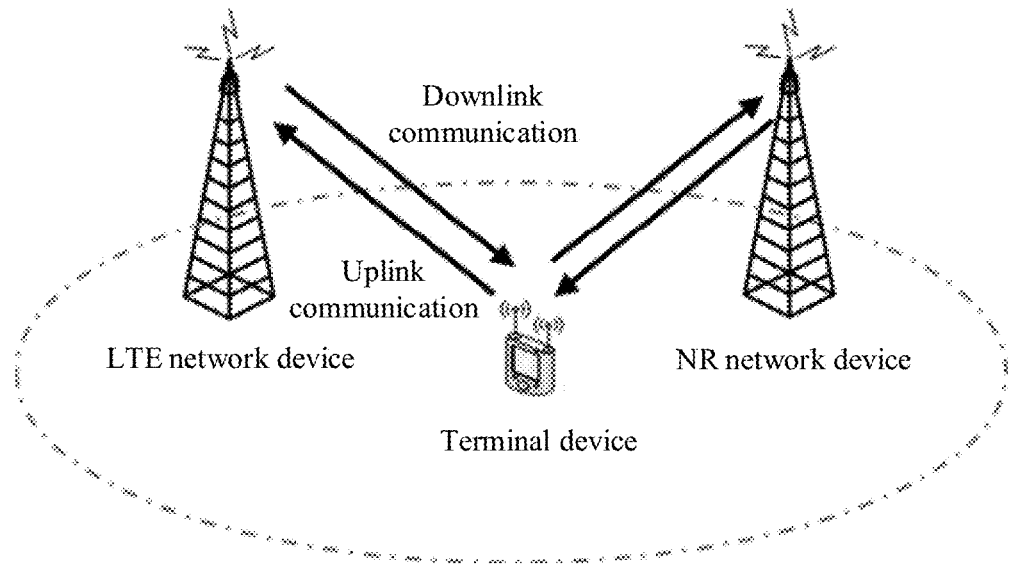
Figure 4:
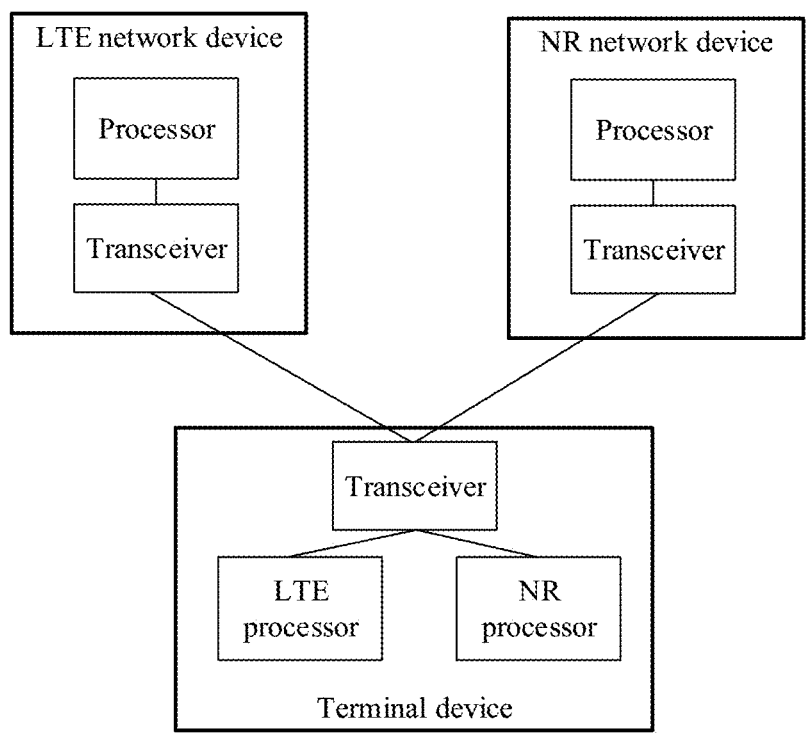

An application scenario of the embodiments of this application is that a terminal device works in an LTE-NR dual-connectivity mode, and the terminal device simultaneously accesses an LTE network device and an NR network device. It should be noted that the LTE network device and the NR network device may be deployed at a same site, as shown in FIG. 1 and FIG. 2. FIG. 2 is a schematic diagram of hardware structures of a network device and a terminal device. Alternatively, the LTE network device and the NR network device may be deployed at different sites, as shown in FIG. 3 and FIG. 4. FIG. 4 is a schematic diagram of hardware structures of a network device and a terminal device. In addition, when the LTE network device and the NR network device are deployed at a same site, the LTE network device and the NR network device may share a same set of hardware devices. FIG. 2 is the schematic diagram of some hardware devices shared between the LTE network device and the NR network device. In FIG. 2, the LTE network device and the NR network device may share a transceiver. Alternatively, when the LTE network device and the NR network device are deployed at a same site, the LTE network device and the NR network device may separately use different hardware devices.

The following describes the technical solutions provided in the embodiments of this application with reference to the accompanying drawings.

Figure 5:
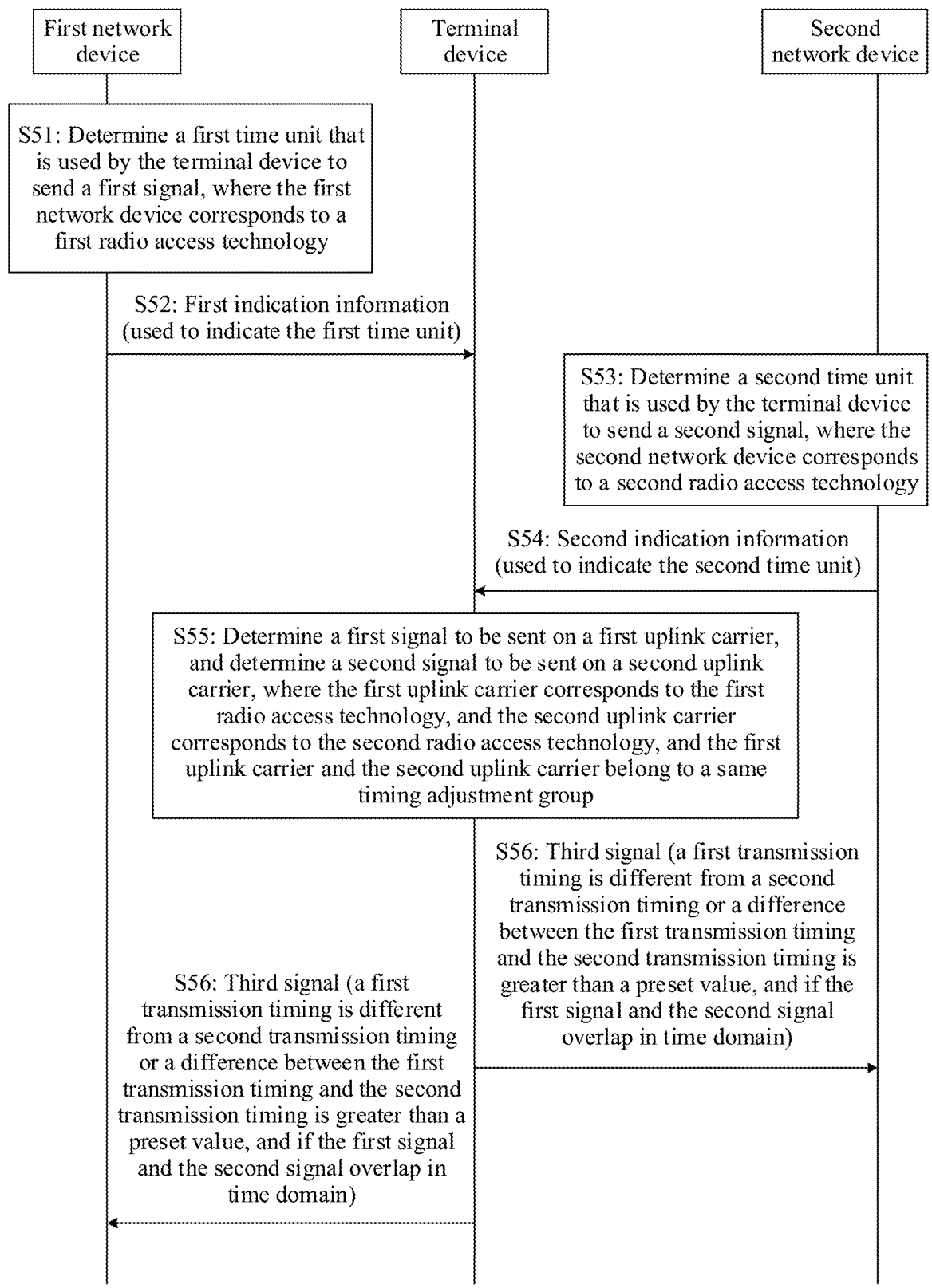
FIG. 5 is a flowchart of a first communication method according to an embodiment of this application.

FIG. 5 is a flowchart of a first communication method according to an embodiment of this application. In the following description, an example in which the method is applied to the network architecture shown in any one of FIG. 1 to FIG. 4 is used. In addition, the method may be performed by three communications apparatuses. The three communications apparatuses are, for example, a first communications apparatus, a second communications apparatus, and a third communications apparatus. The first communications apparatus may be a network device or a communications apparatus that can support a network device in implementing a function required in the method. Alternatively, the first communications apparatus may be a terminal device or a communications apparatus that can support a terminal device in implementing a function required in the method. Certainly, the first communications apparatus may be alternatively another communications apparatus, for example, a chip system. The second communications apparatus may be a network device or a communications apparatus that can support a network device in implementing a function required in the method. Alternatively, the second communications apparatus may be a terminal device or a communications apparatus that can support a terminal device in implementing a function required in the method. Certainly, the second communications apparatus may be alternatively another communications apparatus, for example, a chip system. Similarly, the third communications apparatus may be a network device or a communications apparatus that can support a network device in implementing a function required in the method. Alternatively, the third communications apparatus may be a terminal device or a communications apparatus that can support a terminal device in implementing a function required in the method. Certainly, the third communications apparatus may be alternatively another communications apparatus, for example, a chip system. In addition, implementations of the first communications apparatus, the second communications apparatus, and the third communications apparatus are not limited. For example, the first communications apparatus may be a terminal device, the second communications apparatus is a network device, and the third communications apparatus is a network device. Alternatively, the first communications apparatus, the second communications apparatus, and the third communications apparatus all are network devices. Alternatively, the first communications apparatus, the second communications apparatus, and the third communications apparatus all are terminal devices. Alternatively, the first communications apparatus is a chip system that can support a terminal device in implementing a function required in the method, the second communications apparatus is a network device, and the third communications apparatus is a network device, and the like. The network device is, for example, a base station.

For ease of description, the following uses an example in which the method is performed by a network device and a terminal device. In other words, that the first communications apparatus is a terminal device, the second communications apparatus is a network device (also referred to as a first network device in the following), and the third communications apparatus is a network device (also referred to as a second network device in the following) is used as an example. In the embodiments, an example in which the terminal device is applied to the network architecture shown in FIG. 4 is used. Therefore, the terminal device described below may be the terminal device in the network architecture shown in any one of FIG. 1 to FIG. 4. In addition, the first network device described below may be the LTE network device in the network architecture shown in any one of FIG. 1 to FIG. 4, and the second network device described below may be the NR network device in the network architecture shown in any one of FIG. 1 to FIG. 4. Alternatively, the first network device described below may be the NR network device in the network architecture shown in any one of FIG. 1 to FIG. 4, and the second network device described below may be the LTE network device in the network architecture shown in any one of FIG. 1 to FIG. 4.

S51: A first network device determines a first time unit that is used by a terminal device to send a first signal, where the first network device corresponds to a first radio access technology.

For example, the first radio access technology may be LTE, NR, or another radio access technology.

The first signal is, for example, one of a PUSCH, a PUCCH, an SRS, or a PRACH. The first time unit is an uplink time unit that is configured by the first network device for the terminal device to send the first signal. The first time unit may be a time unit into which a timing advance is not considered. For example, if the first network device corresponds to LTE, the first time unit is, for example, a subframe. Alternatively, if the first network device corresponds to NR, the first time unit is, for example, a slot.

In addition, if the first signal is one of a PUSCH, a PUCCH, or an SRS, the first time unit may be one time unit that is used by the terminal device to send the first signal. Alternatively, if the first signal is a PRACH, the first time unit includes, for example, a plurality of candidate time units that are used by the terminal device to send the PRACH.

If the first radio access technology is LTE, the first time unit is, for example, a subframe. Alternatively, if the first radio access technology is NR, the first time unit is, for example, a slot.

S52: The first network device sends first indication information to the terminal device, and the terminal device receives the first indication information from the first network device, where the first indication information is used to indicate the first time unit, and the first time unit is used by the terminal device to send the first signal to the first network device.

The first indication information may be carried on a physical downlink control channel (physical downlink control channel, PDCCH). For example, the first indication information is carried in downlink control information (downlink control information, DCI). Alternatively, the first indication information is carried in, for example, a system message, and the system message includes, for example, a system information block (system information block, SIB) or a master information block (master information block, MIB). Alternatively, the first indication information is carried in, for example, radio resource control (radio resource control, RRC) signaling. A manner of sending the first indication information is not limited.

If the first signal is one of a PUSCH, a PUCCH, or an SRS, the first time unit may be one time unit that is used by the terminal device to send the first signal, and the first indication information may indicate the time unit. For example, the first indication information may be carried in DCI or RRC signaling. Alternatively, if the first signal is a PRACH, the first time unit may include a plurality of candidate time units that are used by the terminal device to send the PRACH, and the first indication information may indicate the plurality of candidate time units. For example, the first indication information may be carried in a system message.

If the first time unit indicated by the first indication information is one time unit, the terminal device may directly determine, based on the first indication information, to send the first signal to the first network device in the time unit. Alternatively, if the first time unit indicated by the first indication information includes a plurality of time units, after receiving the first indication information, the terminal device may select one time unit from the plurality of candidate time units as required, and determine that the selected time unit is used by the terminal device to send the first signal to the first network device.

The terminal device may determine a first transmission timing based on the first time unit and an uplink timing advance of the first signal. For example, a start moment of the first time unit plus the uplink timing advance is the first transmission timing.

S53: A second network device determines a second time unit that is used by the terminal device to send a second signal, where the second network device corresponds to a second radio access technology.

For example, the first radio access technology is LTE, and the second radio access technology is NR. Alternatively, the first radio access technology is NR, and the second radio access technology is LTE.

The second signal is, for example, one of a PUSCH, a PUCCH, an SRS, or a PRACH. The second time unit is an uplink time unit that is configured by the second network device for the terminal device to send the second signal. The second time unit may be a time unit into which a timing advance is not considered. For example, if the second network device corresponds to LTE, the second time unit is, for example, a subframe. Alternatively, if the second network device corresponds to NR, the second time unit is, for example, a slot.

If the second signal is one of a PUSCH, a PUCCH, or an SRS, the second time unit may be one time unit that is used by the terminal device to send the second signal. Alternatively, if the second signal is a PRACH, the second time unit includes, for example, a plurality of candidate time units that are used by the terminal device to send the PRACH.

In addition, the first signal is one of a PUSCH, a PUCCH, or an SRS, and the second signal is a PRACH. Alternatively, the first signal is a PRACH, and the second signal is one of a PUSCH, a PUCCH, or an SRS. In other words, the first signal and the second signal are different types of signals.

If the second radio access technology is LTE, the second time unit is, for example, a subframe. Alternatively, if the second radio access technology is NR, the second time unit is, for example, a slot.

S54: The second network device sends second indication information to the terminal device, and the terminal device receives the second indication information from the second network device, where the second indication information is used to indicate the second time unit, and the second time unit is used by the terminal device to send the second signal to the second network device.

S51 and S52 may be performed before S53 and S54, or S51 and S52 may be performed after S53 and S54, or S51 and S52, and S53 and S54 may be simultaneously performed.

The second indication information may be carried on a PDCCH. For example, the second indication information is carried in DCI. Alternatively, the second indication information is carried in, for example, a system message, and the system message includes, for example, a SIB or a MIB. Alternatively, the second indication information is, for example, carried in RRC signaling. A manner of sending the second indication information is not limited.

If the second signal is one of a PUSCH, a PUCCH, or an SRS, the second time unit may be one time unit that is used by the terminal device to send the second signal, and the second indication information may indicate the one time unit. Alternatively, if the second signal is a PRACH, the second time unit may include a plurality of candidate time units that are used by the terminal device to send the PRACH, and the second indication information may indicate the plurality of candidate time units.

If the second time unit indicated by the second indication information is one time unit, the terminal device may directly determine, based on the second indication information, to send the second signal to the second network device in the time unit. Alternatively, if the second time unit indicated by the second indication information includes a plurality of time units, after receiving the second indication information, the terminal device may select one time unit from the plurality of candidate time units as required, and determine that the selected time unit is used by the terminal device to send the second signal to the second network device.

The terminal device may determine a second transmission timing based on the second time unit and an uplink timing advance of the second signal. For example, a start moment of the second time unit plus the uplink timing advance is the second transmission timing.

S55: The terminal device determines the first signal to be sent on a first uplink carrier, and determines the second signal to be sent on a second uplink carrier, where the first uplink carrier corresponds to the first radio access technology, and the second uplink carrier corresponds to the second radio access technology.

Optionally, the first uplink carrier and the second uplink carrier may belong to a same timing adjustment group. It should be understood that the terminal device determines, according to a same timing adjustment command or based on a same timing adjustment parameter, transmission timings for sending uplink signals on the first uplink carrier and the second uplink carrier.

S56: When the first transmission timing corresponding to the first signal is different from the second transmission timing corresponding to the second signal or when a difference between the first transmission timing and the second transmission timing is greater than a preset value, and if the first signal and the second signal overlap in time domain, the terminal device sends a third signal.

The third signal is the second signal; or the third signal is the second signal and a part of the first signal, where the part of the first signal is carried on a symbol that does not overlap with a symbol corresponding to the second signal in time domain; or the third signal is the first signal; or the third signal is the first signal and a part of the second signal, where the part of the second signal is carried on a symbol that does not overlap with a symbol corresponding to the first signal in time domain.

If the third signal is the second signal, the third signal is the second signal sent on the second uplink carrier. If the third signal is the second signal and the part of the first signal, where the part of the first signal is carried on the symbol that does not overlap with the symbol corresponding to the second signal in time domain, the third signal is the second signal sent on the second uplink carrier and the part of signal sent on the first uplink carrier. If the third signal is the first signal, the third signal is the first signal sent on the first uplink carrier. If the third signal is the first signal and the part of the second signal, where the part of the second signal is carried on the symbol that does not overlap with the symbol corresponding to the first signal in time domain, the third signal is the first signal sent on the first uplink carrier and the part of signal sent on the second uplink carrier.

In an optional implementation, in addition to sending the third signal, the terminal device may further discard a fourth signal. The fourth signal includes the first signal and the second signal that exclude the third signal. For example, if the third signal is the second signal, the fourth signal is the first signal. Alternatively, if the third signal is the second signal and the part of the first signal, where the part of the first signal is carried on the symbol that does not overlap with the symbol corresponding to the second signal in time domain, the fourth signal is a part of the first signal, where the part of the first signal is carried on a symbol that overlaps with a symbol corresponding to the second signal in time domain. Alternatively, if the third signal is the first signal, the second signal is the first signal. Alternatively, if the third signal is the first signal and the part of the second signal, where the part of the second signal is carried on the symbol that does not overlap with the symbol corresponding to the first signal in time domain, the fourth signal is a part of the second signal, where the part of the second signal is carried on a symbol that overlaps with a symbol corresponding to the first signal in time domain.

"Discarding" described in this embodiment of this application may mean that the first signal or the part of signal is not sent on a current resource of the first signal. The terminal device may store the signal. It is not limited that discarding needs to be performed in this embodiment, for example, the signal may be delayed being sent. Certainly, the terminal device may alternatively discard and does not store the first signal or the part of signal. Alternatively, "discarding" may mean that the second signal or the part of signal is not sent on a current resource of the first signal. The terminal device may store the signal. It is not limited that discarding needs to be performed in this embodiment, for example, the signal may be delayed being sent. Certainly, the terminal device may alternatively discard and does not store the second signal or the part of signal. This is applied to the following description, and details are not described again.

How the terminal device determines, as the third signal, the second signal and a specific part included in the first signal, or how the terminal device determines, as the fourth signal, the second signal and a specific part included in the first signal, is related to the first transmission timing and the second transmission timing, or in other words, is related to a relationship between time units determined based on transmission timings. In this embodiment of this application, a transmission timing of the first signal is referred to as the first transmission timing, and a transmission timing of the second signal is referred to as the second transmission timing.

1. The first time unit and the second time unit are in a first relationship.

Figure 6:
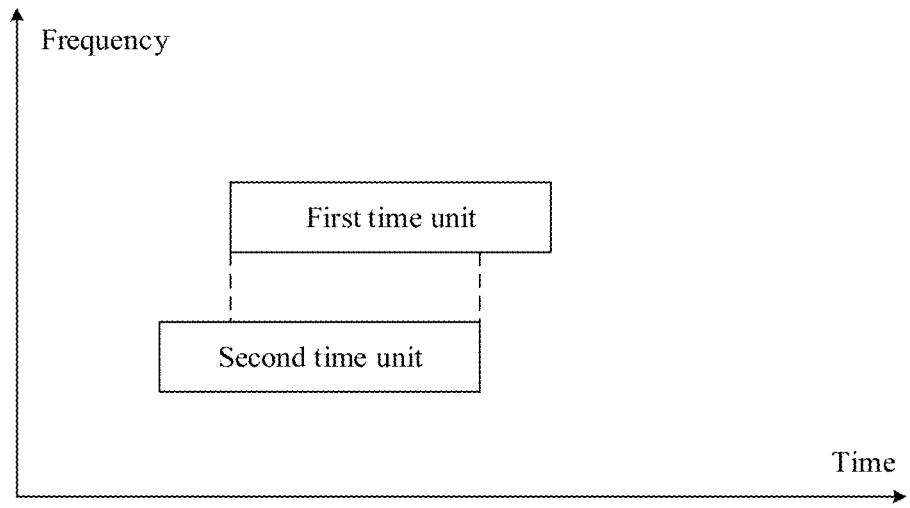
FIG. 6 is a schematic diagram of a first relationship between a first time unit and a second time unit according to an embodiment of this application.

For the first relationship between the first time unit and the second time unit, refer to FIG. 6. FIG. 6 shows an example in which the first time unit and the second time unit have a same length. This is not specifically limited thereto. In addition, frequency domain positions of the first time unit and the second time unit in FIG. 6 are merely an example, and do not represent an actual case. The first time unit and the second time unit overlap in time domain. For example, the first time unit and the second time unit may completely overlap in time domain. However, after the uplink timing advance is considered, because the first signal and the second signal are different types of signals, corresponding uplink timing advances are different. Therefore, the transmission timing of the first signal is different from the transmission timing of the second signal. In other words, a time domain start position at which the terminal device actually sends the first signal is different from a time domain start position at which the terminal device sends the second signal. In addition, although the time domain start positions for sending the first signal and the second signal are different, the first time unit and the second time unit overlap in time domain.

In the first relationship between the first time unit and the second time unit, if the first transmission timing is different from the second transmission timing, and the first time unit and the second time unit overlap in time domain, the terminal device may send the third signal, and optionally, may further discard the fourth signal. Alternatively, if the first transmission timing is different from the second transmission timing, the difference between the first transmission timing and the second transmission timing is greater than the preset value, and the first time unit and the second time unit overlap in time domain, the terminal device may send the third signal, and optionally, may further discard the fourth signal.

In some cases, if the difference between the first transmission timing and the second transmission timing is relatively small, it may be considered that the first transmission timing and the second transmission timing are approximately the same, or in other words, when the difference between the first transmission timing and the second transmission timing is relatively small, the terminal device sends the first signal at the first transmission timing and sends the second signal at the second transmission timing. Interference between the first signal and the second signal may be relatively low. Therefore, if the difference between the first transmission timing and the second transmission timing is relatively small, for example, less than or equal to the preset value, the terminal device may continue to normally send the first signal and the second signal, and does not need to discard the fourth signal. However, if the difference between the first transmission timing and the second transmission timing is relatively large, for example, greater than the preset value, the terminal device may send the third signal, and may further discard the fourth signal, to maximally reduce interference between signals. The preset value is, for example, configured by a network device, or specified in a protocol.

In addition, the difference between the first transmission timing and the second transmission timing may be an actual difference between the first transmission timing and the second transmission timing, and the difference may be greater than 0 or less than 0; or may be an absolute value of an actual difference between the first transmission timing and the second transmission timing. In this case, a corresponding preset value is different based on different definitions of the difference, and a person skilled in the art can understand this.

In the first relationship between the first time unit and the second time unit, the terminal device may use the first signal or the second signal as the third signal. In this case, the first signal is the fourth signal, and the second signal is the third signal; or the first signal is the third signal, and the second signal is the fourth signal.

In this manner of overlapping between the first time unit and the second time unit, the first time unit and the second time unit may largely overlap in time domain. Therefore, the terminal device may choose to send only the first signal or the second signal, to reduce interference between signals.

Because the terminal device sends only the first signal or the second signal, this relates to how the terminal device selects a specific signal for sending.

In a first manner in which the terminal device selects the third signal, the terminal device may select the third signal based on a type of a signal.

For example, the terminal device selects the first-type signal as the third signal. For example, the first signal is the first-type signal, for example, the first signal is one of a PUSCH, a PUCCH, or an SRS; and the second signal is the second-type signal, for example, the second signal is a PRACH. In this case, the terminal device may send the first signal, and optionally, may further discard the second signal. In this case, the first network device may receive the first signal. However, because the terminal device does not send the second signal to the second network device, the second network device does not receive the second signal.

Alternatively, the terminal device selects the second-type signal as the third signal. For example, the first signal is the first-type signal, for example, the first signal is one of a PUSCH, a PUCCH, or an SRS; and the second signal is the second-type signal, for example, the second signal is a PRACH. In this case, the terminal device may send the second signal, and optionally, may further discard the first signal. In this case, the second network device may receive the second signal. However, because the terminal device does not send the first signal to the first network device, the first network device does not receive the first signal.

In a second manner in which the terminal device selects the third signal, the terminal device may select the third signal based on a priority of a signal.

For example, the terminal device determines, as the third signal, a higher-priority signal in the first signal and the second signal.

For example, an order of priorities of signals is as follows: PRACH>PUCCH>PUSCH>SRS. In this case, for example, if the second signal is a PRACH, and the first signal is a PUCCH, the terminal device may send the first signal, and optionally, may further discard the second signal. In this case, the first network device may receive the first signal. However, because the terminal device does not send the second signal to the second network device, the second network device does not receive the second signal. Alternatively, for example, if the second signal is a PUSCH, and the first signal is a PRACH, the terminal device may send the second signal, and optionally, may further discard the first signal. In this case, the second network device may receive the second signal. However, because the terminal device does not send the first signal to the first network device, the first network device does not receive the first signal.

In this manner, the higher-priority signal can be sent in time as much as possible. Certainly, the order of priorities is merely an example, and the order of priorities of signals is not limited in actual application. For example, in some orders of priorities, a PUCCH may have a higher priority than a PRACH, or a PUSCH may have a higher priority than a PUCCH.

In a third manner in which the terminal device selects the third signal, the terminal device may select the third signal based on a radio access technology type of a signal.

For example, the terminal device selects a signal corresponding to the first radio access technology as the third signal. For example, if the first signal is the signal corresponding to the first radio access technology, and the second signal is a signal corresponding to the second radio access technology, the terminal device may send the first signal, and optionally, may further discard the second signal. In this case, the first network device may receive the first signal. However, because the terminal device does not send the second signal to the second network device, the second network device does not receive the second signal. The second radio access technology is, for example, NR.

Alternatively, the terminal device selects a signal corresponding to the second radio access technology as the third signal. If the first signal is a signal corresponding to the first radio access technology, and the second signal is the signal corresponding to the second radio access technology, the terminal device may send the second signal, and optionally, may further discard the first signal. In this case, the second network device may receive the second signal. However, because the terminal device does not send the first signal to the first network device, the first network device does not receive the first signal. The first radio access technology is, for example, LTE.

In a fourth manner in which the terminal device selects the third signal, the terminal device may select the third signal based on a transmission timing of a signal.

For example, the terminal device may select a signal with an earlier timing as the third signal. For example, if the first transmission timing is later than the second transmission timing in time domain, the terminal device may send the second signal, and optionally, may further discard the first signal. In this case, the second network device may receive the second signal. However, because the terminal device does not send the first signal to the first network device, the first network device does not receive the first signal. Alternatively, if the second transmission timing is later than the first transmission timing in time domain, the terminal device may send the first signal, and optionally, may further discard the second signal. In this case, the first network device may receive the first signal. However, because the terminal device does not send the second signal to the second network device, the second network device does not receive the second signal. A signal whose timing is earlier may be a signal that is more urgent or important. In this manner, the terminal device may send the signal whose timing is earlier in time.

Alternatively, the terminal device may select a signal with a later timing as the third signal. For example, if the first transmission timing is earlier than the second transmission timing in time domain, the terminal device may send the second signal, and optionally, may further discard the first signal. In this case, the second network device may receive the second signal. However, because the terminal device does not send the first signal to the first network device, the first network device does not receive the first signal. Alternatively, if the second transmission timing is earlier than the first transmission timing in time domain, the terminal device may send the first signal, and optionally, may further discard the second signal. In this case, the first network device may receive the first signal. However, because the terminal device does not send the second signal to the second network device, the second network device does not receive the second signal.

In a fifth manner in which the terminal device selects the third signal, the terminal device may randomly select the third signal.

For example, if the terminal device randomly uses the first signal as the third signal, the terminal device may send the first signal, and optionally, may further discard the second signal. In this case, the first network device may receive the first signal. However, because the terminal device does not send the second signal to the second network device, the second network device does not receive the second signal.

Alternatively, the terminal device may randomly use the second signal as the third signal, and the terminal device may send the second signal, and optionally, may further discard the first signal. In this case, the second network device may receive the second signal. However, because the terminal device does not send the first signal to the first network device, the first network device does not receive the first signal.

The foregoing described manners in which the terminal device selects the third signal are merely some examples. How the terminal device selects the third signal is not limited in this embodiment of this application.

2. The first time unit and the second time unit are in a second relationship.

Figure 7:
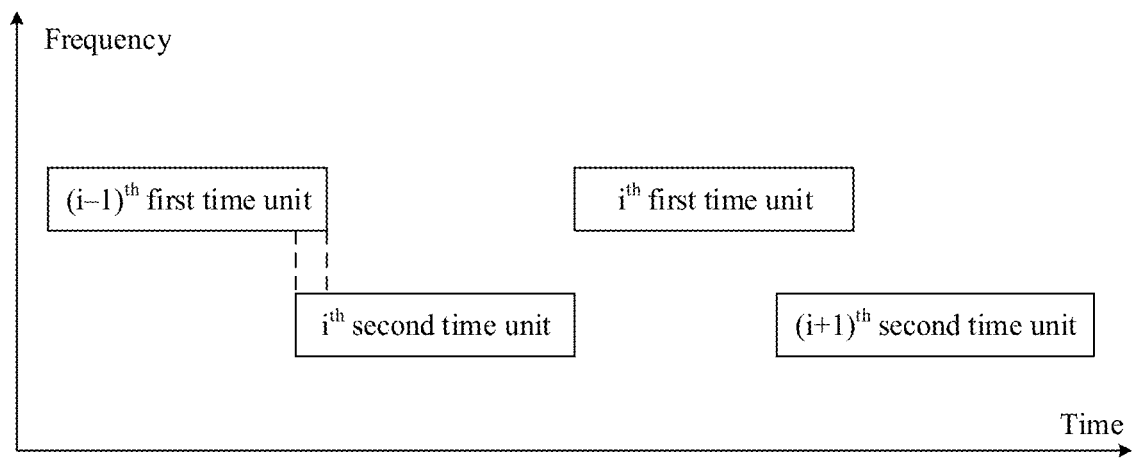
FIG. 7 is a schematic diagram of a second relationship between a first time unit and a second time unit according to an embodiment of this application.

For the second relationship between the first time unit and the second time unit, refer to FIG. 7. The first time unit and the second time unit overlap in time domain. For example, the first time unit and the second time unit may completely overlap in time domain. However, after the uplink timing advance is considered, because the first signal and the second signal are different types of signals, corresponding uplink timing advances are different. Therefore, the transmission timing of the first signal is different from the transmission timing of the second signal. In other words, a time domain start position at which the terminal device actually sends the first signal is different from a time domain start position at which the terminal device sends the second signal. Although the time domain start positions for sending the first signal and the second signal are different, the first time unit and the second time unit overlap in time domain. It may be learned from FIG. 7 that there may be a relatively large difference between uplink timing advances of two signals. Therefore, the first time unit may overlap with a previous second time unit in time domain, or the second time unit may overlap with a previous first time unit in time domain. For example, the first time unit periodically appears, and the second time unit also periodically appears. Therefore, it may be understood that there are a plurality of first time units and also a plurality of second time units. For example, an $i^{th}$ first time unit and an $(i-1)^{th}$ second time unit overlap in time domain, or an $i^{th}$ second time unit and an $(i-1)^{th}$ first time unit overlap in time domain. In FIG. 7, an example in which the $i^{th}$ second time unit and the $(i-1)^{th}$ first time unit overlap in time domain is used.

In the second relationship between the first time unit and the second time unit, if the first transmission timing is different from the second transmission timing, and the first time unit and the second time unit overlap in time domain (specifically, the $i^{th}$ first time unit and the $(i-1)^{th}$ second time unit overlap in time domain, or the $i^{th}$ second time unit and the $(i-1)^{th}$ first time unit overlap in time domain), the terminal device may send the third signal, and optionally, may further discard the fourth signal. Alternatively, if the first transmission timing and the second transmission timing are different or if a difference between the first transmission timing and the second transmission timing is greater than a preset value, and the first time unit and the second time unit overlap in time domain (specifically, the $i^{th}$ first time unit and the $(i-1)^{th}$ second time unit overlap in time domain, or the $i^{th}$ second time unit and the $(i-1)^{th}$ first time unit overlap in time domain). In this case, the terminal device may send the third signal, and optionally, may further discard the fourth signal.

For explanations of the preset value, refer to the foregoing description. Details are not described again.

The third signal includes, for example, the first signal and the part of the first signal, where the part of the first signal is carried on the symbol that does not overlap with the symbol corresponding to the second signal in time domain. Alternatively, the third signal includes, for example, the second signal and the part of the second signal, where the part of the second signal is carried on the symbol that does not overlap with the symbol corresponding to the first signal in time domain. It may be understood that, in the second relationship between the first time unit and the second time unit, the terminal device may use, as the third signal, the first signal and the part included in the second signal. In this case, the first signal and the part included in the second signal are the third signal. A remaining part included in the second signal, that is, the part of the second signal, where the part of the second signal is carried on the symbol that overlaps with the symbol corresponding to the first signal in time domain, may be discarded as the fourth signal by the terminal device. Alternatively, the terminal device may use, as the third signal, the second signal and the part included in the first signal. In this case, the second signal and the part of signal included in the first signal are the third signal. A remaining part included in the first signal, that is, the part of the first signal, where the part of the first signal is carried on the symbol that overlaps with the symbol corresponding to the second signal in time domain, may be discarded as the fourth signal by the terminal device. The part of signal that is of the first signal and that overlaps with the second signal in time domain may be understood as a signal of the first signal, where the signal of the first signal is carried on the symbol that overlaps with the symbol corresponding to the second signal in time domain; or may be understood as a part that is of the first signal and that overlaps with the second signal in time domain. The part of signal that is of the second signal and that overlaps with the first signal in time domain may be understood as a signal of the second signal, where the signal of the second signal is carried on the symbol that overlaps with the symbol corresponding to the first signal in time domain; or may be understood as a part that is of the second signal and that overlaps with the first signal in time domain.

In the second relationship between the first time unit and the second time unit, because a quantity of symbols corresponding to the first signal that overlap with symbols corresponding to the second signal in time domain is generally 1 (or a quantity of symbols corresponding to the second signal that overlap with symbols corresponding to the first signal in time domain is also generally 1), the fourth signal discarded by the terminal device is usually a signal carried on one symbol. In comparison, a relatively small amount of information is discarded, thereby helping maximally ensuring integrity of a sent signal. Certainly, in this embodiment of this application, a quantity of overlapping symbols corresponding to two signals in time domain is not limited, and therefore a quantity of symbols on which a discarded signal is carried is not limited either. In comparison with discarding an entire signal, an amount of discarded information can be maximally reduced in such a discarding manner, so that a receive end can obtain more information.

There may be a relatively small overlapping area between the first time unit and the second time unit in time domain in such an overlapping manner of the first time unit and the second time unit. This may be understood as that there is a relatively small overlapping area between the $i^{th}$ first time unit and the $i^{th}$ second time unit in time domain, or that there is a relatively small overlapping area between the $i^{th}$ first time unit and the $(i-1)^{th}$ second time unit in time domain, or that there is a relatively small overlapping area between the $i^{th}$ second time unit and the $(i-1)^{th}$ first time unit in time domain. Therefore, the terminal device may choose to discard only the part of signal that the first signal and the second signal overlap, and may retain most content of the first signal and the second signal, to send as much content as possible. In addition, in this manner, symbols occupied by the third signal do not overlap with each other in time domain, thereby reducing interference between signals.

Alternatively, the terminal device may use the first signal or the second signal as the third signal. In this case, the first signal is the third signal, and the second signal is the fourth signal; or the second signal is the third signal, and the first signal is the fourth signal.

The following describes how the terminal device selects the third signal.

In a first manner in which the terminal device selects the third signal, the terminal device may select the third signal based on a type of a signal.

For example, the terminal device selects the first-type signal as the third signal; or selects, as the third signal, the second-type signal and a signal of the first-type signal, where the signal of the first-type signal is carried on a symbol that does not overlap with a symbol corresponding to the second-type signal in time domain. For example, the first signal is the first-type signal, for example, the first signal is one of a PUSCH, a PUCCH, or an SRS; and the second signal is the second-type signal, for example, the second signal is a PRACH. In this case, the terminal device may send the first signal and the signal of the second signal, where the signal of the second signal is carried on the symbol that does not overlap with the symbol corresponding to the first signal in time domain. Optionally, the terminal device may further discard the signal of the second signal, where the signal of the second signal is carried on the symbol that overlaps a symbol corresponding to the first signal in time domain. In this case, the first network device may receive the first signal, and the second network device may receive the signal of the second signal, where the signal of the second signal is carried on the symbol that does not overlap with the symbol corresponding to the first signal in time domain.

Alternatively, the terminal device may select the first-type signal as the third signal; or select, as the third signal, the second-type signal and a signal of the first-type signal, where the signal of the first-type signal is carried on a symbol that does not overlap with a symbol corresponding to the second-type signal in time domain. For example, the first signal is the first-type signal. For example, the first signal is one of a PUSCH, a PUCCH, or an SRS. The second signal is the second-type signal. For example, the second signal is a PRACH. In this case, the terminal device may send the first signal. In addition, the second transmission timing is later than the first transmission timing, and the signal of the second signal includes a demodulation reference signal (demodulation reference signal, DMRS), where the signal of the second signal is carried on the symbol that overlaps with the symbol corresponding to the first signal in time domain. Optionally, if the terminal device needs to discard the fourth signal, the terminal device may discard the second signal as the fourth signal. For a network device used as the receive end, other information included in the second signal needs to be demodulated based on the DMRS. If the terminal device discards the DMRS, the network device cannot demodulate the other information included in the second signal. Therefore, sending of the other information included in the second signal is meaningless, and the terminal device may discard the entire second signal. In this case, the first network device may receive the first signal. However, because the terminal device does not send the second signal to the second network device, the second network device does not receive the second signal.

Alternatively, the terminal device may select the second-type signal as the third signal; or select, as the third signal, the first-type signal and a signal of the second-type signal, where the signal of the second-type signal is carried on a symbol that does not overlap with a symbol corresponding to the first-type signal in time domain. For example, the first signal is the first-type signal, for example, the first signal is one of a PUSCH, a PUCCH, or an SRS; and the second signal is the second-type signal, for example, the second signal is a PRACH. In this case, the terminal device may send the second signal and the signal that is of the first signal and that does not overlap with the second signal in time domain. Optionally, the terminal device may further discard the signal of the first signal, where the signal of the first signal is carried on the symbol that overlaps with the symbol corresponding to the second signal in time domain. In this case, the second network device may receive the second signal, and the first network device may receive the signal of the first signal, where the signal of the first signal is carried on the symbol that does not overlap with the symbol corresponding to the second signal in time domain.

Alternatively, the terminal device selects the second-type signal as the third signal; or selects, as the third signal, the first-type signal and a signal of the second-type signal, where the signal of the second-type signal is carried on a symbol that does not overlap with a symbol corresponding to the first-type signal in time domain. For example, the first signal is the first-type signal. For example, the first signal is one of a PUSCH, a PUCCH, or an SRS. The second signal is the second-type signal. For example, the second signal is a PRACH. In this case, the terminal device may send the second signal. In addition, the first transmission timing is later than the second transmission timing, and the signal of the first signal includes a DMRS, where the signal of the first signal is carried on the symbol that overlaps with the symbol corresponding to the second signal in time domain. Therefore, if the terminal device needs to discard the fourth signal, the terminal device may discard the first signal as the fourth signal. In this case, the second network device may receive the second signal. However, because the terminal device does not send the first signal to the first network device, the first network device does not receive the first signal.

In a second manner in which the terminal device selects the third signal, the terminal device may select the third signal based on a priority of a signal.

For example, the terminal device determines, as the third signal, a higher-priority signal in the first signal and the second signal; or determines, as the third signal, a higher-priority signal and a signal of a lower-priority signal, where the signal of the lower-priority signal is carried on a symbol that overlaps with a symbol corresponding to the higher-priority signal in time domain.

For example, an order of priorities of signals is as follows: PRACH>PUCCH>PUSCH>SRS. In this case, for example, if the first signal is a PRACH, and the second signal is a PUCCH, the terminal device may send the PRACH and a signal of the PUCCH, where the signal of the PUCCH is carried on a symbol that does not overlap with a symbol corresponding to the PRACH in time domain. Optionally, the terminal device may further discard a signal of the PUCCH, where the signal of the PUCCH is carried on a symbol that overlaps with a symbol corresponding to the PRACH in time domain. In this case, the first network device may receive the PRACH, and the second network device may receive the signal of the PUCCH, where the signal of the PUCCH is carried on the symbol that does not overlap with the symbol corresponding to the PRACH in time domain. Alternatively, for example, if the first signal is a PUSCH, and the second signal is a PUCCH, the terminal device may send the PUCCH and a signal of the PUSCH, where the signal of the PUSCH is carried on a symbol that does not overlap with a symbol corresponding to the PUCCH in time domain. Optionally, the terminal device may further discard a signal of the PUSCH, where the signal of the PUSCH is carried on a symbol that overlaps with a symbol corresponding to the PUCCH in time domain. In this case, the first network device may receive the PUCCH, and the second network device may receive the signal of the PUSCH, where the signal of the PUSCH is carried on the symbol that does not overlap with the symbol corresponding to the PUCCH in time domain.

In this manner, the higher-priority signal can be sent in time as much as possible. Certainly, the order of priorities is merely an example, and the order of priorities of signals is not limited in actual application. For example, in some orders of priorities, a PUCCH may have a higher priority than a PRACH, or a PUSCH may have a higher priority than a PUCCH.

In a third manner in which the terminal device selects the third signal, the terminal device may select the third signal based on a radio access technology type of a signal.

For example, the terminal device selects a signal corresponding to the first radio access technology as the third signal; or selects, as the third signal, a signal corresponding to the first radio access technology and a signal of a signal corresponding to the second radio access technology, where the signal of the signal corresponding to the second radio access technology is carried on a symbol that does not overlap with a symbol corresponding to the signal corresponding to the first radio access technology in time domain. For example, the first signal is a signal corresponding to the first radio access technology, and the second signal is a signal corresponding to the second radio access technology. For example, if the first radio access technology is LTE, and the second radio access technology is NR, the first signal is an LTE signal, and the second signal is an NR signal. In this case, the terminal device may send the LTE signal and a signal of the NR signal, where the signal of the NR signal is carried on a symbol that does not overlap with a symbol corresponding to the LTE signal in time domain. Optionally, the terminal device may further discard a signal of the NR signal, where the signal of the NR signal is carried on a symbol that overlaps with a symbol corresponding to the LTE signal in time domain. In this case, the first network device may receive the LTE signal, and the second network device may receive the signal of the NR signal, where the signal of the NR signal is carried on the symbol that does not overlap with the symbol corresponding to the LTE signal in time domain.

Alternatively, the terminal device selects a signal corresponding to the first radio access technology as the third signal; or selects, as the third signal, a signal corresponding to the first radio access technology and a signal of a signal corresponding to the second radio access technology, where the signal of the signal corresponding to the second radio access technology is carried on a symbol that does not overlap with a symbol corresponding to the signal corresponding to the first radio access technology in time domain. For example, the first signal is a signal corresponding to the first radio access technology, and the second signal is a signal corresponding to the second radio access technology. For example, if the first radio access technology is LTE, and the second radio access technology is NR, the first signal is an LTE signal, and the second signal is an NR signal. The second transmission timing is later than the first transmission timing, and the signal of the second signal includes a DMRS, where the signal of the second signal is carried on the symbol that overlaps with the symbol corresponding to the first signal in time domain. In this case, the terminal device may send only the LTE signal. Optionally, the terminal device may further discard the NR signal as the fourth signal. In this case, the first network device may receive the LTE signal. However, because the terminal device does not send the NR signal to the second network device, the second network device does not receive the NR signal.

Alternatively, the terminal device selects a signal corresponding to the second radio access technology as the third signal; or selects, as the fourth signal, a signal corresponding to the second radio access technology and a signal of a signal corresponding to the first radio access technology, where the signal of the signal corresponding to the first radio access technology is carried on a symbol that does not overlap with a symbol corresponding to the signal corresponding to the second radio access technology in time domain. For example, the first signal is a signal corresponding to the first radio access technology, and the second signal is a signal corresponding to the second radio access technology. For example, if the first radio access technology is LTE, and the second radio access technology is NR, the first signal is an LTE signal, and the second signal is an NR signal. In this case, the terminal device may send the NR signal and a signal of the LTE signal, where the signal of the LTE signal is carried on a symbol that does not overlap with a symbol corresponding to the NR signal in time domain. Optionally, the terminal device may further discard a signal of the LTE signal, where the signal of the LTE signal is carried on a symbol that overlaps with a symbol corresponding to the NR signal in time domain. In this case, the second network device may receive the NR signal, and the first network device may receive the signal of the LTE signal, where the signal of the LTE signal is carried on the symbol that does not overlap with the symbol corresponding to the NR signal in time domain.

Alternatively, the terminal device selects a signal corresponding to the second radio access technology as the third signal; or selects, as the fourth signal, a signal corresponding to the second radio access technology and a signal of a signal corresponding to the first radio access technology, where the signal of the signal corresponding to the first radio access technology is carried on a symbol that does not overlap with a symbol corresponding to the signal corresponding to the second radio access technology in time domain. For example, the first signal is a signal corresponding to the first radio access technology, and the second signal is a signal corresponding to the second radio access technology. For example, if the first radio access technology is LTE, and the second radio access technology is NR, the first signal is an LTE signal, and the second signal is an NR signal. The first transmission timing is later than the second transmission timing, and the signal of the LTE signal includes a DMRS, where the signal of the LTE signal is carried on the symbol that overlaps with the symbol corresponding to the NR signal in time domain. In this case, the terminal device may send only the NR signal. Optionally, the terminal device may further discard the LTE signal as the fourth signal. In this case, the second network device may receive the NR signal. However, because the terminal device does not send the LTE signal to the first network device, the first network device does not receive the LTE signal.

In a fourth manner in which the terminal device selects the third signal, the terminal device may select the third signal based on a transmission timing of a signal.

For example, the terminal device may select a signal with an earlier timing as the third signal. For example, if the first transmission timing is later than the second transmission timing in time domain, the terminal device may send the second signal. Optionally, the terminal device may further discard the first signal. For example, if the first transmission timing is later than the second transmission timing, and the signal of the first signal includes a DMRS, where the signal of the first signal is carried on the symbol that overlaps with the symbol corresponding to the second signal in time domain, the terminal device may send only the second signal, and optionally, may further directly discard the first signal. In this case, the second network device may receive the second signal. However, because the terminal device does not send the first signal to the first network device, the first network device does not receive the first signal. Alternatively, if the second transmission timing is later than the first transmission timing in time domain, the terminal device may send the first signal. Optionally, the terminal device may further discard the second signal. For example, if the second transmission timing is later than the first transmission timing, and the signal of the second signal includes a DMRS, where the signal of the second signal is carried on the symbol that overlaps with the symbol corresponding to the first signal in time domain, the terminal device may send only the first signal, and optionally, may further directly discard the second signal. In this case, the first network device may receive the first signal. However, because the terminal device does not send the second signal to the second network device, the second network device does not receive the second signal.

Alternatively, the terminal device may select a signal with an earlier timing as the fourth signal. For example, the first transmission timing is later than the second transmission timing in time domain, and the terminal device may send the second signal and the signal of the first signal, where the signal of the first signal is carried on the symbol that does not overlap with the symbol corresponding to the second signal in time domain. Optionally, the terminal device may further discard the signal of the first signal, where the signal of the first signal is carried on the symbol that overlaps with the symbol corresponding to the second signal in time domain. For example, the first transmission timing is later than the second transmission timing, and the signal of the first signal does not include a DMRS, where the signal of the first signal is carried on the symbol that overlaps with the symbol corresponding to the second signal in time domain. In this case, the terminal device may discard only the signal of the first signal, where the signal of the first signal is carried on the symbol that overlaps with the symbol corresponding to the second signal in time domain, and reserve a remaining part of the first signal. In this case, the second network device may receive the second signal, and the first network device may receive the signal of the first signal, where the signal of the first signal is carried on the symbol that does not overlap with the symbol corresponding to the second signal in time domain. Alternatively, the second transmission timing is later than the first transmission timing in time domain, and the terminal device may send the first signal and the signal of the second signal, where the signal of the second signal is carried on the symbol that does not overlap with the symbol corresponding to the first signal in time domain. Optionally, the terminal device may further discard the signal of the second signal, where the signal of the second signal is carried on the symbol that overlaps with the symbol corresponding to the first signal in time domain. For example, if the second transmission timing is later than the first transmission timing, and the signal of the second signal does not include a DMRS, where the signal of the second signal is carried on the symbol that overlaps with the signal corresponding to the first signal in time domain, the terminal device may discard only the signal of the second signal, where the signal of the second signal is carried on the symbol that overlaps with the signal corresponding to the first signal in time domain, and reserve a remaining part of the second signal. In this case, the first network device may receive the first signal, and the second network device may receive the signal of the second signal, where the signal of the second signal is carried on the symbol that does not overlap with the symbol corresponding to the first signal in time domain.

Alternatively, the terminal device may select a signal with a later timing as the third signal. For example, if the first transmission timing is earlier than the second transmission timing in time domain, the terminal device may send the second signal. Optionally, the terminal device may further discard the first signal. In this case, the second network device may receive the second signal. However, because the terminal device does not send the first signal to the first network device, the first network device does not receive the first signal. Alternatively, if the second transmission timing is earlier than the first transmission timing in time domain, the terminal device may send the first signal. Optionally, the terminal device may further discard the second signal. In this case, the first network device may receive the first signal. However, because the terminal device does not send the second signal to the second network device, the second network device does not receive the second signal.

Alternatively, the terminal device may select a signal with a later timing as the third signal. For example, the first transmission timing is earlier than the second transmission timing in time domain, and the terminal device may send the second signal and the signal of the first signal, where the signal of the first signal is carried on the symbol that does not overlap with the symbol corresponding to the second signal in time domain. Optionally, the terminal device may further discard the signal of the first signal, where the signal of the first signal is carried on the symbol that overlaps with the symbol corresponding to the second signal in time domain. In this case, the second network device may receive the second signal, and the first network device may receive the signal of the first signal, where the signal of the first signal is carried on the symbol that does not overlap with the symbol corresponding to the second signal in time domain. Alternatively, the second transmission timing is earlier than the first transmission timing in time domain, and the terminal device may send the first signal and the signal of the second signal, where the signal of the second signal is carried on the symbol that does not overlap with the symbol corresponding to the first signal in time domain. Optionally, the terminal device may further discard the signal of the second signal, where the signal of the second signal is carried on the symbol that overlaps with the symbol corresponding to the first signal in time domain. In this case, the first network device may receive the first signal, and the second network device may receive the signal of the second signal, where the signal of the second signal is carried on the symbol that does not overlap with the symbol corresponding to the first signal in time domain.

In a fifth manner in which the terminal device selects the third signal, the terminal device may randomly select the third signal.

For example, the terminal device may randomly use the second signal as the third signal, and the terminal device sends the second signal. Optionally, the terminal device may further discard the first signal. In this case, the second network device may receive the second signal. However, because the terminal device does not send the first signal to the first network device, the first network device does not receive the first signal. Alternatively, the terminal device randomly uses the first signal as the third signal, and the terminal device may send the first signal. Optionally, the terminal device may further discard the second signal. In this case, the first network device may receive the first signal. However, because the terminal device does not send the second signal to the second network device, the second network device does not receive the second signal.

Alternatively, the terminal device may randomly use, as the third signal, the first signal and the signal of the second signal, where the signal of the second signal is carried on the symbol that does not overlap with the symbol corresponding to the first signal in time domain; and the terminal device sends the first signal and the signal of the second signal, where the signal of the second signal is carried on the symbol that does not overlap with the symbol corresponding to the first signal in time domain. Optionally, the terminal device may further discard the signal of the second signal, where the signal of the second signal is carried on the symbol that overlaps with the symbol corresponding to the first signal in time domain. In this case, the first network device may receive the first signal, and the second network device may receive the signal of the second signal, where the signal of the second signal is carried on the symbol that does not overlap with the symbol corresponding to the first signal in time domain. Alternatively, the terminal device may randomly use, as the third signal, the second signal and the signal of the first signal, where the signal of the first signal is carried on the symbol that does not overlap with the symbol corresponding to the second signal in time domain; and the terminal device sends the second signal and the signal of the first signal, where the signal of the first signal is carried on the symbol that does not overlap with the symbol corresponding to the second signal in time domain. Optionally, the terminal device may further discard the signal of the first signal, where the signal of the first signal is carried on the symbol that overlaps with the symbol corresponding to the second signal in time domain. In this case, the second network device may receive the second signal, and the first network device may receive the signal of the first signal, where the signal of the first signal is carried on the symbol that does not overlap with the symbol corresponding to the second signal in time domain.

The foregoing described manners in which the terminal device selects the third signal are merely some examples. How the terminal device selects the third signal is not limited in this embodiment of this application.

In addition, it may be learned from the foregoing description that the first network device may receive the third signal, or may not receive the third signal; and that the second network device may receive the third signal, or may not receive the third signal. FIG. 5 merely shows an example in which the first network device receives the third signal and the second network device also receives the third signal.

In this embodiment of this application, if determining that the transmission timing of the first signal is different from the transmission timing of the second signal or that the difference between the two transmission timings is greater than the preset value, and that the first signal and the second signal overlap in time domain, the terminal device may send the first signal and the part of signal of the second signal. It is equivalent that signals that are sent do not overlap in time domain, so that the two signals are sent in a time division mode, to reduce interference between the signals.

The embodiment shown in FIG. 5 provides the technical solution of how to reduce interference when transmission timings of two signals are different. However, for an MR-DC terminal device, when a transmission timing of an LTE signal sent by the terminal device is the same as a transmission timing of an NR signal sent by the terminal device, interference between the LTE signal and the NR signal may also occur due to non-idealities of hardware of the terminal device, causing degradation of communication quality.

An LTE system is used as an example. In addition to notifying all terminal devices of a common time division duplex (time division duplex, TDD) configuration of a cell, an LTE network device may additionally notify the MR-DC terminal device of a reference downlink configuration, the MR-DC terminal device can send an LTE signal only in an uplink subframe indicated by the additionally notified reference downlink configuration. Specifically, there are seven LTE TDD configurations, as shown in Table 1.

TABLE 1

| TDD | Subframe n | | | | | | | | | |
| --- | --- | --- | --- | --- | --- | --- | --- | --- | --- | --- |
| configuration | 0 | 1 | 2 | 3 | 4 | 5 | 6 | 7 | 8 | 9 |
| 0 | — | — | U | U | U | — | — | U | U | U |
| 1 | — | — | U | U | — | — | — | U | U | — |
| 2 | — | — | U | — | — | — | — | U | — | — |
| 3 | — | — | U | U | U | — | — | — | — | — |
| 4 | — | — | U | U | — | — | — | — | — | — |

TABLE 1-continued

| TDD configuration | Subframe n | | | | | | | | | |
|---|---|---|---|---|---|---|---|---|---|---|
| | 0 | 1 | 2 | 3 | 4 | 5 | 6 | 7 | 8 | 9 |
| 5 | — | — | U | — | — | — | — | — | — | — |
| 6 | — | — | U | U | U | — | — | U | U | — |

For a TDD configuration, a subframe denoted as "U" indicates an available uplink subframe, and a subframe denoted as "–" indicates a downlink subframe or a special subframe. For example, if the LTE network device first configures a common TDD configuration of a cell, for example, a TDD configuration 1 shown in Table 1, all terminal devices in a cell served by the LTE network device can send an uplink signal only in a subframe 2, a subframe 3, a subframe 7, or a subframe 8. In addition, the LTE network device further additionally configures a reference TDD configuration for the MR-DC terminal device, for example, a TDD configuration 2 shown in Table 1. In this case, the MR-DC terminal device can send an LTE uplink signal only in the subframe 2 or the subframe 7, and the MR-DC terminal device can send an NR uplink signal in the subframe 3 or the subframe 8.

If all terminal devices in an LTE cell are MR-DC terminal devices or most terminal devices are MR-DC terminal devices, in the foregoing solution, the MR-DC terminal device can send an LTE uplink signal only in the subframe 2 and the subframe 7, and no NR signal can be sent because the terminal device is in the LTE cell. As a result, the subframe 3 and the subframe 8 are always idle, and this undoubtedly reduces utilization of LTE network resources.

In view of this, an embodiment of this application provides a second communication method. In the communication method, in addition to configuring a TDD configuration and a reference TDD configuration for a terminal device, a network device further configures an offset for the terminal device. The terminal device may determine a third uplink time unit based on the reference TDD configuration and the offset. For example, an offset may be configured for a part of terminal devices; and no offset may be configured for another part of terminal devices. Different offsets may be configured for the part of terminal devices. Therefore, different terminal devices may determine different uplink time units, so that uplink time units of a maximum quantity can be used, to improve network resource utilization.

Figure 8:
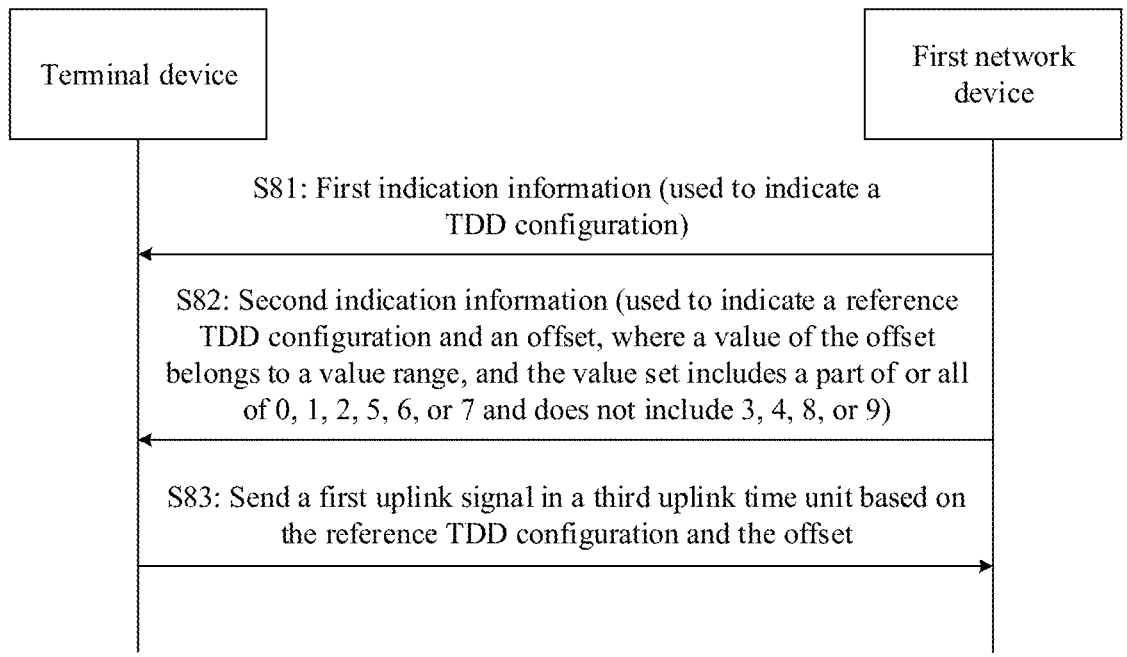
FIG. 8 is a flowchart of a second communication method according to an embodiment of this application.

FIG. 8 is a flowchart of the second communication method. In the following description, an example in which the method is applied to the network architecture shown in any one of FIG. 1 to FIG. 4 is used. In addition, the method may be performed by two communications apparatuses. The two communications apparatuses are, for example, a first communications apparatus and a second communications apparatus. The first communications apparatus may be a network device or a communications apparatus that can support a network device in implementing a function required in the method. Alternatively, the first communications apparatus may be a terminal device or a communications apparatus that can support a terminal device in implementing a function required in the method. Certainly, the first communications apparatus may be alternatively another communications apparatus, for example, a chip system. Similarly, the second communications apparatus may be a network device or a communications apparatus that can support a network device in implementing a function required in the method. Alternatively, the second communications apparatus may be a terminal device or a communications apparatus that can support a terminal device in implementing a function required in the method. Certainly, the second communications apparatus may be alternatively another communications apparatus, for example, a chip system. In addition, implementations of the first communications apparatus and the second communications apparatus are not limited. For example, the first communications apparatus may be a terminal device, and the second communications apparatus is a network device. Alternatively, both the first communications apparatus and a third communications apparatus are network devices, or both the first communications apparatus and the third communications apparatus are terminal devices. Alternatively, the first communications apparatus is a chip system that can support a terminal device in implementing a function required in the method, and the second communications apparatus is a network device, or the like. The network device is, for example, a base station.

For ease of description, the following uses an example in which the method is performed by a network device and a terminal device. In other words, that the first communications apparatus is a terminal device, the second communications apparatus is a network device (also referred to as a first network device in the following) is used as an example. In this embodiment, the network architecture shown in any one of FIG. 1 to FIG. 4 is used as an example. Therefore, the terminal device described below may be the terminal device in the network architecture shown in any one of FIG. 1 to FIG. 4. In addition, the first network device described below may be the LTE network device in the network architecture shown in any one of FIG. 1 to FIG. 4, or may be the NR network device in the network architecture shown in any one of FIG. 1 to FIG. 4.

S81: The first network device sends first indication information to a terminal device, and the terminal device receives the first indication information from the first network device, where the first indication information indicates a TDD configuration, the TDD configuration is used to indicate at least one first uplink time unit and at least one downlink time unit in a time domain unit, the time domain unit includes N time units, and N is an integer greater than 1.

For example, if the first network device is an LTE network device, the time domain unit is, for example, a radio frame, and the time unit is, for example, a subframe.

In addition, the terminal device in this embodiment of this application is, for example, an MR-DC terminal device.

The TDD configuration may be a common TDD configuration of a cell, for example, any TDD configuration shown in Table 1.

S82: The first network device sends second indication information to the terminal device, and the terminal device receives the second indication information from the first network device, where the second indication information indicates a reference TDD configuration and an offset, the reference TDD configuration indicates k second uplink time units in the N time units, k is an integer greater than or equal to 1 and less than N, a value of the offset belongs to a value range, the value range includes a part of or all of 0, 1, 2, 5, 6, or 7 and does not include 3, 4, 8, or 9.

It should be noted that the value range may be a range that actually exists, or the value range may be only an umbrella term for a plurality of values, but is not a range that actually exists. In other words, the plurality of values may not necessarily be in one range.

The reference TDD configuration may be a reference downlink configuration additionally notified by the first network device, and the terminal device should have sent an LTE signal in an uplink subframe indicated by the reference TDD configuration. The offset is, for example, an offset of the reference TDD configuration relative to the TDD configuration.

The value range is, for example, {0, 1}, {0, 1, 5, 6}, {0, 5}, {0, 1, 2}, {0, 1, 2, 5, 6, 7}, {0, 1, 5}, or {0, 1, 2, 5, 6}.

In a first manner of determining the value range, the value range may be determined based on the TDD configuration. In this case, for the value range determined based on the TDD configuration, refer to Table 2.

TABLE 2

| TDD configuration | Value range |
| --- | --- |
| 1 | {0, 1, 5, 6} |
| 2 | {0, 5} |
| 3 | {0, 1, 2} |
| 4 | {0, 1} |
| 0 | {0, 1, 2, 5, 6, 7} |
| 6 | {0, 1, 2, 5, 6} |

One row in Table 2 may be considered as one item. The value range determined based on the TDD configuration may include one or more items in Table 2, or may include an item that is not included in Table 2. The left column of Table 2 represents numbers of the TDD configuration in Table 1. For example, a TDD configuration 1 in Table 2 represents a TDD configuration 1 shown in Table 1. The items included in Table 2 are explained as follows:

when the TDD configuration is a TDD configuration 0, the value range is {0, 1, 2, 5, 6, 7};
when the TDD configuration is the TDD configuration 1, the value range is {0, 1, 5, 6};
when the TDD configuration is a TDD configuration 2, the value range is {0, 5};
when the TDD configuration is a TDD configuration 3, the value range is {0, 1, 2};
when the TDD configuration is a TDD configuration 4, the value range is {0, 1}; or when the TDD configuration is a TDD configuration 6, the value range is {0, 1, 2, 5, 6}.

In addition, from a perspective of the terminal device, this embodiment of this application may include one or more of the following items:

when the TDD configuration 1 is configured for the terminal device, the terminal device does not expect to receive a value of an offset other than values in the value range {0, 1, 5, 6} from the network device;
when the TDD configuration 0 is configured for the terminal device, the terminal device does not expect to receive a value of an offset other than values in the value range {0, 1, 2, 5, 6, 7} from the network device;
when the TDD configuration 2 is configured for the terminal device, the terminal device does not expect to receive a value of an offset other than values in the value range {0, 5} from the network device;
when the TDD configuration 3 is configured for the terminal device, the terminal device does not expect to receive a value of an offset other than values in the value range {0, 1, 2} from the network device;
when the TDD configuration 4 is configured for the terminal device, the terminal device does not expect to receive a value of an offset other than values in the value range {0, 1} from the network device; or when the TDD configuration 6 is configured for the terminal device, the terminal device does not expect to receive a value of an offset other than values in the value range {0, 1, 2, 5, 6} from the network device.

For example, if this embodiment of this application includes: When the TDD configuration 1 is configured for the terminal device, the terminal device does not expect to receive a value of an offset other than values in the value range {0, 1, 5, 6} from the network device, if the value of the offset sent by the network device to the terminal device is a value other than values in the value range {0, 1, 5, 6}, for example, the value of the offset is 2, the terminal device considers this case as an error, and may not perform processing.

For example, when the TDD configuration is the TDD configuration 1 shown in Table 1, and the value range is {0, 1, 5, 6}, the value of the offset sent by the first network device to the terminal device may be 0, 1, 5, or 6. In addition, the first network device may send different offsets to different terminal devices. For example, the first network device sends a value 1 of an offset to a part of terminal devices, and sends a value 5 of an offset to another part of terminal devices, so that different terminal devices may use different offsets, and uplink time units determined by the terminal devices are different. In this way, network resources can be maximally and appropriately used, and network resource utilization is improved. Further, a quantity of values in the value range is related to the TDD configuration. Therefore, for a given TDD configuration, the second indication information sent by the network device to the terminal device needs to include an indication field with only a relatively small quantity of bits to indicate an offset. For example, when the value range is {0, 1, 5, 6}, the indication field needs to include two bits. When the value range is {0, 5}, the indication field needs to include only one bit. In this way, overheads of the second indication information can be reduced.

In a second manner of determining the value range, the value range may be determined based on the reference TDD configuration. In this case, for the value range determined based on the reference TDD configuration, refer to Table 3.

TABLE 3

| Reference TDD configuration | Value range |
| --- | --- |
| 2 | {0, 1, 5, 6} |
| 4 | {0, 1, 5} |
| 5 | {0, 1, 2, 5, 6} |

The value ranges shown in Table 3 are available on a premise that a cell does not support the TDD configuration 0 or the TDD configuration 6 shown in Table 1.

One row in Table 3 may be considered as one item. The value range determined based on the reference TDD configuration may include one or more items in Table 3, or may include an item that is not included in Table 3. The left column of Table 3 represents numbers of the TDD configuration in Table 1. The items included in Table 3 are explained as follows:

when the reference TDD configuration is the TDD configuration 2, the value range is {0, 1, 2, 5, 6};
when the reference TDD configuration is the TDD configuration 4, the value range is {0, 1, 5}; or
when the reference TDD configuration is a TDD configuration 5, the value range is {0, 1, 2, 5, 6}.

From a perspective of the terminal device, this embodiment of this application may include one or more of the following items:

when the reference TDD configuration 2 is configured for the terminal device, the terminal device does not expect to receive a value of an offset other than values in the value range {0, 1, 5, 6} from the network device;

when the reference TDD configuration 4 is configured for the terminal device, the terminal device does not expect to receive a value of an offset other than values in the value range {0, 1, 5} from the network device; or when the reference TDD configuration 5 is configured for the terminal device, the terminal device does not expect to receive a value of an offset other than values in the value range {0, 1, 2, 5, 6} from the network device.

For example, if this embodiment of this application includes: When the reference TDD configuration 2 is configured for the terminal device, the terminal device does not expect to receive a value of an offset other than values in the value range {0, 1, 5, 6} from the network device, if a value of the offset sent by the network device to the terminal device is a value other than values in the value range {0, 1, 5, 6}, for example, a value of the offset is 2, the terminal device considers this case as an error, and may not perform processing.

For example, when the TDD configuration is the TDD configuration 5 shown in Table 1, and the value range is {0, 1, 2, 5, 6}, the value of the offset sent by the first network device to the terminal device may be 0, 1, 2, 5, or 6. In addition, the first network device may send different offsets to different terminal devices. For example, the first network device sends a value 1 of an offset to a part of terminal devices, and sends a value 2 of an offset to another part of terminal devices, so that different terminal devices may use different offsets, and uplink time units determined by the terminal devices are different. In this way, network resources can be maximally and appropriately used, and network resource utilization is improved. Further, a quantity of values in the value range is related to the reference TDD configuration. Therefore, for a given TDD configuration, the second indication information sent by the network device to the terminal device needs to include an indication field with only a relatively small quantity of bits to indicate an offset. For example, when the value range is {0, 1, 2, 5, 6}, the indication field needs to include three bits. When the value range is {0, 1, 5}, the indication field needs to include only two bits. In this way, overheads of the second indication information can be reduced.

Alternatively, for another value range determined based on the reference TDD configuration, refer to Table 4.

TABLE 4

| Reference TDD configuration | Value range |
| --- | --- |
| 2 | {0, 1, 2, 5, 6, 7} |
| 4 | {0, 1, 5, 6} |
| 5 | {0, 1, 2, 5, 6, 7} |

The value ranges shown in Table 4 are available on a premise that a cell supports the TDD configuration 0 and the TDD configuration 6 shown in Table 1.

One row in Table 4 may be considered as one item. The value range determined based on the reference TDD configuration may include one or more items in Table 4, or may include an item that is not included in Table 4. The left column of Table 4 represents numbers of the TDD configuration in Table 1. The items included in Table 4 are explained as follows:

when the reference TDD configuration is the TDD configuration 2, the value range is {0, 1, 2, 5, 6, 7};

when the reference TDD configuration is the TDD configuration 4, the value range is {0, 1, 5, 6}; or when the reference TDD configuration is a TDD configuration 5, the value range is {0, 1, 2, 5, 6, 7}.

From a perspective of the terminal device, this embodiment of this application may include one or more of the following items:

when the reference TDD configuration 2 is configured for the terminal device, the terminal device does not expect to receive a value of an offset other than values in the value range {0, 1, 2, 5, 6, 7} from the network device;

when the reference TDD configuration 4 is configured for the terminal device, the terminal device does not expect to receive a value of an offset other than values in the value range {0, 1, 5, 6} from the network device; or when the reference TDD configuration 5 is configured for the terminal device, the terminal device does not expect to receive a value of an offset other than values in the value range {0, 1, 2, 5, 6, 7} from the network device.

For example, if this embodiment of this application includes: When the reference TDD configuration 2 is configured for the terminal device, the terminal device does not expect to receive a value of an offset other than values in the value range {0, 1, 2, 5, 6, 7} from the network device. If the value of the offset sent by the network device to the terminal device is a value other than values in the value range {0, 1, 2, 5, 6, 7}, for example, the value of the offset is 3, the terminal device considers this case as an error, and may not perform processing.

For example, when the TDD configuration is the TDD configuration 5 shown in Table 1, and the value range is {0, 1, 2, 5, 6, 7}, the value of offset sent by the first network device to the terminal device may be 0, 1, 2, 5, 6, or 7. In addition, the first network device may send different offsets to different terminal devices. For example, the first network device sends a value 1 of an offset to a part of terminal devices, and sends an offset to another part of terminal devices, so that different terminal devices may use different offsets, and uplink time units determined by the terminal devices are different. In this way, network resources can be maximally and appropriately used, and network resource utilization is improved. Further, a quantity of values in the value range is related to the reference TDD configuration. Therefore, for a given TDD configuration, the second indication information sent by the network device to the terminal device needs to include an indication field with only a relatively small quantity of bits to indicate an offset. For example, when the value range is {0, 1, 2, 5, 6, 7}, the indication field needs to include three bits. When the value range is {0, 1, 5, 6}, the indication field needs to include only two bits. In this way, overheads of the second indication information can be reduced.

In a third manner of determining the value range, the value range may be determined based on the TDD configuration and the reference TDD configuration. In this case, for the value range determined based on the TDD configuration and the reference TDD configuration, refer to Table 5.

TABLE 5

| TDD configuration | Reference TDD configuration | Value range |
| --- | --- | --- |
| 1 | 2 | {0, 1} or {0, 1, 5, 6} |
|  | 4 | {0, 5} |

TABLE 5-continued

| TDD configuration | Reference TDD configuration | Value range |
|---|---|---|
| | 5 | {0, 1, 5, 6} |
| 2 | 5 | {0, 5} |
| 3 | 4 | {0, 1} |
| | 5 | {0, 1, 2} |
| 4 | 5 | {0, 1} |
| 0 | 2 | {0, 1, 2} or {0, 1, 2, 5, 6, 7} |
| | 4 | {0, 1, 5, 6} |
| | 5 | {0, 1, 2, 5, 6, 7} |
| 6 | 2 | {0, 1, 5, 6} |
| | 4 | {0, 1, 5} |
| | 5 | {0, 1, 2, 5, 6} |

One row in Table 5 may be considered as one item. The value range determined based on the TDD configuration may include one or more items in Table 5, or may include an item that is not included in Table 5. The left column of Table 5 represents numbers of the TDD configuration in Table 1. The items included in Table 5 are explained as follows:

when the TDD configuration is the TDD configuration 1, and the reference TDD configuration is the TDD configuration 2, the value range is {0, 1} or {0, 1, 5, 6};

when the TDD configuration is the TDD configuration 1, and the reference TDD configuration is the TDD configuration 4, the value range is {0, 5};

when the TDD configuration is the TDD configuration 1, and the reference TDD configuration is the TDD configuration 5, the value range is {0, 1, 5, 6};

when the TDD configuration is the TDD configuration 2, and the reference TDD configuration is the TDD configuration 5, the value range is {0, 5};

when the TDD configuration is the TDD configuration 3, and the reference TDD configuration is the TDD configuration 4, the value range is {0, 1};

when the TDD configuration is the TDD configuration 3, and the reference TDD configuration is the TDD configuration 5, the value range is {0, 1, 2};

when the TDD configuration is the TDD configuration 4, and the reference TDD configuration is the TDD configuration 5, the value range is {0, 1};

when the TDD configuration is the TDD configuration 0, and the reference TDD configuration is the TDD configuration 2, the value range is {0, 1, 2} or {0, 1, 2, 5, 6, 7};

when the TDD configuration is the TDD configuration 0, and the reference TDD configuration is the TDD configuration 4, the value range is {0, 1, 5, 6};

when the TDD configuration is the TDD configuration 0, and the reference TDD configuration is the TDD configuration 5, the value range is {0, 1, 2, 5, 6, 7};

when the TDD configuration is the TDD configuration 6, and the reference TDD configuration is the TDD configuration 2, the value range is {0, 1, 5, 6};

when the TDD configuration is the TDD configuration 6, and the reference TDD configuration is the TDD configuration 4, the value range is {0, 1, 5}; or when the TDD configuration is the TDD configuration 6, and the reference TDD configuration is the TDD configuration 5, the value range is {0, 1, 2, 5, 6}.

From a perspective of the terminal device, this embodiment of this application may include one or more of the following items:

when the TDD configuration 1 and the reference TDD configuration 2 are configured for the terminal device, the terminal device does not expect to receive a value of an offset other than values in the value range {0, 1, 5, 6} from the network device;

when the TDD configuration 1 and the reference TDD configuration 4 are configured for the terminal device, the terminal device does not expect to receive a value of an offset other than values in the value range {0, 5} from the network device;

when the TDD configuration 1 and the reference TDD configuration 5 are configured for the terminal device, the terminal device does not expect to receive a value of an offset other than values in the value range {0, 1, 5, 6} from the network device;

when the TDD configuration 2 and the reference TDD configuration 5 are configured for the terminal device, the terminal device does not expect to receive a value of an offset other than values in the value range {0, 5} from the network device;

when the TDD configuration 3 and the reference TDD configuration 4 are configured for the terminal device, the terminal device does not expect to receive a value of an offset other than values in the value range {0, 1} from the network device;

when the TDD configuration 3 and the reference TDD configuration 5 are configured for the terminal device, the terminal device does not expect to receive a value of an offset other than values in the value range {0, 1, 2} from the network device;

when the TDD configuration 4 and the reference TDD configuration 5 are configured for the terminal device, the terminal device does not expect to receive a value of an offset other than values in the value range {0, 1} from the network device;

when the TDD configuration 0 and the reference TDD configuration 2 are configured for the terminal device, the terminal device does not expect to receive a value of an offset other than values in the value range {0, 1, 2} or {0, 1, 2, 5, 6, 7} from the network device;

when the TDD configuration 0 and the reference TDD configuration 4 are configured for the terminal device, the terminal device does not expect to receive a value of an offset other than values in the value range {0, 1, 5, 6} from the network device;

when the TDD configuration 0 and the reference TDD configuration 5 are configured for the terminal device, the terminal device does not expect to receive a value of an offset other than values in the value range {0, 1, 2, 5, 6, 7} from the network device;

when the TDD configuration 6 and the reference TDD configuration 2 are configured for the terminal device, the terminal device does not expect to receive a value of an offset other than values in the value range {0, 1, 5, 6} from the network device;

when the TDD configuration 6 and the reference TDD configuration 4 are configured for the terminal device, the terminal device does not expect to receive a value of an offset other than values in the value range {0, 1, 5} from the network device; or when the TDD configuration 6 and the reference TDD configuration 5 are configured for the terminal device, the terminal device does not expect to receive a value of an offset other than values in the value range {0, 1, 2, 5, 6} from the network device.

For example, if this embodiment of this application includes: When the TDD configuration 1 and the reference TDD configuration 2 are configured for the terminal device, the terminal device does not expect to receive a value of an offset other than values in the value range {0, 1, 5, 6} from the network device, if the value of the offset sent by the network device to the terminal device is a value other than values in the value range {0, 1, 5, 6} or {0, 1}, for example, the value of the offset is 2, the terminal device considers this case as an error, and may not perform processing.

For example, when the TDD configuration is the TDD configuration 1 and the reference TDD configuration is the TDD configuration 5 shown in Table 1, and the value range is {0, 1, 5, 6}, the value of the offset sent by the first network device to the terminal device may be 0, 1, 5, or 6. In addition, the first network device may send different offsets to different terminal devices. For example, the first network device sends a value 1 of an offset to a part of terminal devices, and sends an offset to another part of terminal devices, so that different terminal devices may use different offsets, and uplink time units determined by the terminal devices are different. In this way, network resources can be maximally and appropriately used, and network resource utilization is improved. Further, a quantity of values in the value range is related to the TDD configuration and the reference TDD configuration. Therefore, for a given TDD configuration and a given reference TDD configuration, the second indication information sent by the network device to the terminal device needs to include an indication field with only a relatively small quantity of bits to indicate an offset. For example, when the value range is {0, 1, 5, 6}, the indication field needs to include two bits. When the value range is {0, 1}, the indication field needs to include only one bit. In this way, overheads of the second indication information can be reduced.

The foregoing value range is merely an example, and a specific value range is not limited in this embodiment of this application. The value range may be configured by the first network device, or specified in a protocol. In this case, to send an offset to the terminal device, the first network device first needs to determine a value range, and then selects the value of the offset from the value range.

For example, the first network device may determine the value range based on the TDD configuration and/or the reference TDD configuration. Specifically, the first network device may determine the value range based on the TDD configuration, or determine the value range based on the reference TDD configuration, or determine the value range based on the TDD configuration and the reference TDD configuration. After determining the value range, the first network device may select the offset from the value range. How the first network device selects the offset from the value range is not limited in this embodiment of this application.

S83: The terminal device sends a first uplink signal to the first network device in a third uplink time unit based on the reference TDD configuration and the offset, and the first network device receives the first uplink signal from the terminal device in the third uplink time unit based on the reference TDD configuration and the offset, where the third uplink time unit is one or more of the at least one first uplink time unit.

The terminal device may determine the third uplink time unit based on the reference TDD configuration and the offset, to send the first uplink signal to the first network device in the third uplink time unit. The first network device may also determine the third uplink time unit based on the reference TDD configuration and the offset, to receive the first uplink signal from the first network device in the third uplink time unit. The first uplink signal is, for example, a PUCCH. This is not specifically limited.

For example, numbers of the N time units included in the time domain unit are 0, 1, ..., N−1; or 1, 2, ..., N. A start number of the time units is not limited. Numbers of the k second uplink time units in the N time units indicated by the reference TDD configuration are $n_1, n_2, \ldots,$ and $n_k$, and a value of the offset is i. The terminal device may determine that the third uplink time unit is one or more of time units whose numbers are $n_1+i, n_2+i, \ldots,$ and $n_k+i$ in the time domain unit, or one or more of time units whose numbers are $\mod(n_1+i, N), \mod(n_2+i, N), \ldots,$ and $\mod(n_k+i, N)$ in the time domain unit. Likewise, the network device may also determine the third uplink time unit in a same manner.

The third uplink time unit is one or more of the at least one first uplink time unit. It indicates that an uplink time unit determined by the terminal device based on the reference TDD configuration and the offset needs to be an uplink time unit in the TDD configuration, and cannot be a downlink time unit or another time unit in the TDD configuration.

For example, the TDD configuration is the TDD configuration 1, the reference TDD configuration is the TDD configuration 2, and the time unit is a subframe. When no offset is configured, the terminal device can send an uplink signal only in the subframe 2 and/or the subframe 7. After an offset is configured, for example, the configured offset is 1, the terminal device can send the uplink signal only in the subframe 3 and/or the subframe 8. In other words, when no offset is configured, the terminal device can send the uplink signal only in a subframe n. When an offset is configured and the offset is x, the terminal device can send the uplink signal only in a subframe $y=\mod(n+x, 10)$, where mod represents a modulo operation. It should be noted that the subframe y needs to be a subframe that is identified as "U" in the TDD configuration.

For example, the first network device may configure offsets for a part of terminal devices, and does not configure offsets for another part of terminal devices. Values of the offsets configured for the part of terminal devices may be different. In this manner, different terminal devices may send uplink signals in different uplink time units, to utilize each uplink time unit as much as possible, and network resource utilization is improved. In addition, by configuring an offset, flexibility of the reference TDD configuration is also improved.

The following describes, with reference to the accompanying drawings, apparatuses configured to implement the foregoing methods in the embodiments of this application. Therefore, all the foregoing content may be used in subsequent embodiments, and repeated content is not described again.

Figure 9:
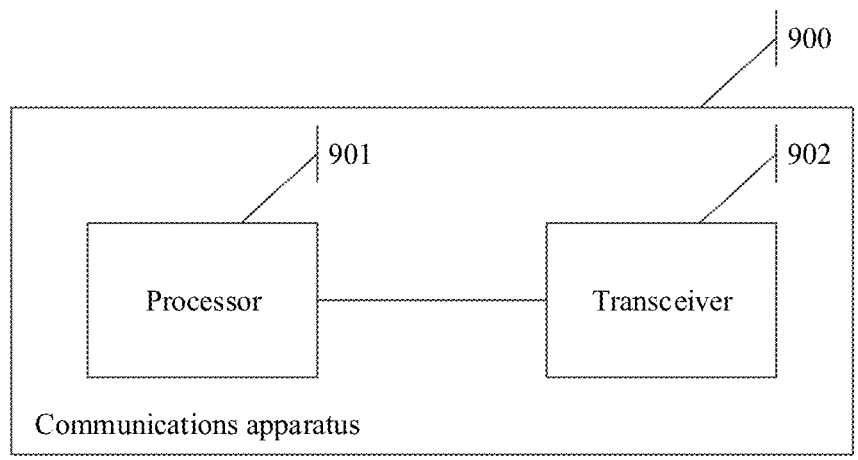
FIG. 9 is a schematic structural diagram of a communications apparatus that can implement a function of a terminal device according to an embodiment of this application.

An embodiment of this application provides a first type of communications apparatus, and the communications apparatus is, for example, a first communications apparatus. Referring to FIG. 9, the communications apparatus is, for example, a communications apparatus 900. The communications apparatus 900 can implement functions of the terminal device described above. For example, the communications apparatus 900 may be a communications device, or the communications apparatus 900 may be a chip disposed in a communications device. For example, the communications device may be the terminal device described above. The communications apparatus 900 may include a processor 901 and a transceiver 902, and the transceiver 902 may be connected to the processor 901. The processor 901 may be configured to perform operations other than a sending/receiving operation performed by the terminal device in the embodiment shown in FIG. 5, for example, S55 in the embodiment shown in FIG. 5 and/or another process used to support the technology described in this specification. The transceiver 902 may be configured to perform all sending and receiving operations performed by the terminal device in the embodiment shown in FIG. 5, for example, S52, S54, and S56 in the embodiment shown in FIG. 5, and/or another process used to support the technology described in this specification.

For example, the processor 901 is configured to determine a first signal to be sent on a first uplink carrier, and determine a second signal to be sent on a second uplink carrier, where the first uplink carrier corresponds to a first radio access technology, and the second uplink carrier corresponds to a second radio access technology; and the transceiver 902 is configured to: when the processor 901 determines that a first transmission timing corresponding to the first signal is different from a second transmission timing corresponding to the second signal or that a difference between the first transmission timing and the second transmission timing is greater than a preset value, and that the first signal and the second signal overlap in time domain, send a third signal, where the third signal is the second signal sent on the second uplink carrier, or the third signal is the second signal sent on the second uplink carrier and a part of the first signal sent on the first uplink carrier, where the part of the first signal is carried on a symbol that does not overlap with a symbol corresponding to the second signal in time domain.

In a possible implementation, the first radio access technology is NR, and the second radio access technology is LTE.

In a possible implementation, the first signal is one of a PUCCH, a PUSCH, or an SRS, and the second signal is a PRACH.

In a possible implementation, a start moment of the first signal is later than a start moment of the second signal in time domain.

In a possible implementation, the processor 901 is further configured to discard the first signal, or discard a part of the first signal, where the part of the first signal is carried on a symbol that overlaps with a symbol corresponding to the second signal in time domain.

In a possible implementation, the transceiver 902 is further configured to receive first indication information from the first network device, where the first indication information is used to indicate the communications apparatus 900 to send the first signal to the first network device.

In a possible implementation, the transceiver 902 is further configured to receive second indication information from the second network device, where the second indication information is used to indicate the communications apparatus 900 to send the second signal to the second network device.

All related content of the steps in the foregoing method embodiment may be cited in functional description of the corresponding functional modules. Details are not described herein again.

Figure 10:
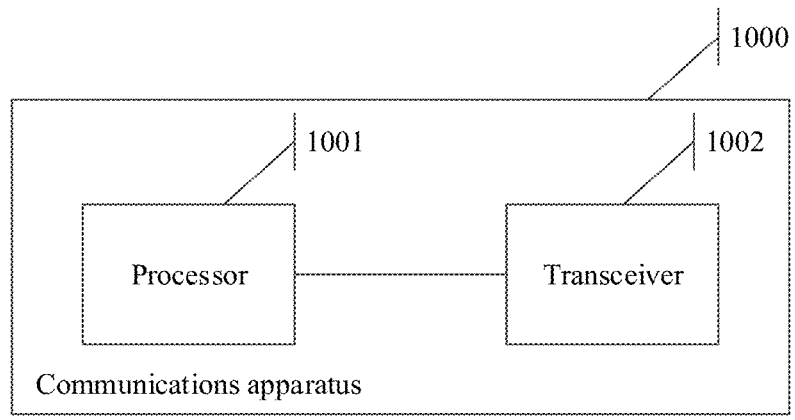
FIG. 10 is a schematic structural diagram of a communications apparatus that can implement a function of a first network device according to an embodiment of this application.

An embodiment of this application provides a second type of communications apparatus, and the communications apparatus is, for example, a second communications apparatus. Referring to FIG. 10, the communications apparatus is, for example, a communications apparatus 1000. The communications apparatus 1000 can implement functions of the first network device described above. For example, the communications apparatus 1000 may be a communications device, or the communications apparatus 1000 may be a chip disposed in a communications device. For example, the communications device may be the first network device described above. The communications apparatus 1000 may include a processor 1001 and a transceiver 1002, and the transceiver 1002 may be connected to the processor 1001. The processor 1001 may be configured to perform operations other than a sending/receiving operation performed by the first network device in the embodiment shown in FIG. 5, for example, S51 in the embodiment shown in FIG. 5 and/or another process used to support the technology described in this specification. The transceiver 1002 may be configured to perform all sending and receiving operations performed by the first network device in the embodiment shown in FIG. 5, for example, S52 and S56 in the embodiment shown in FIG. 5, and/or another process used to support the technology described in this specification.

For example, the processor 1001 is configured to determine a first time unit that is used by a terminal device to send a first signal, and the communications apparatus 1000 corresponds to a first radio access technology; and the transceiver 1002 is configured to send first indication information to the terminal device, where the first indication information is used to indicate the first time unit, and the first time unit is used by the terminal device to send the first signal to the communications apparatus 1000.

All related content of the steps in the foregoing method embodiment may be cited in functional description of the corresponding functional modules. Details are not described herein again.

Figure 11:
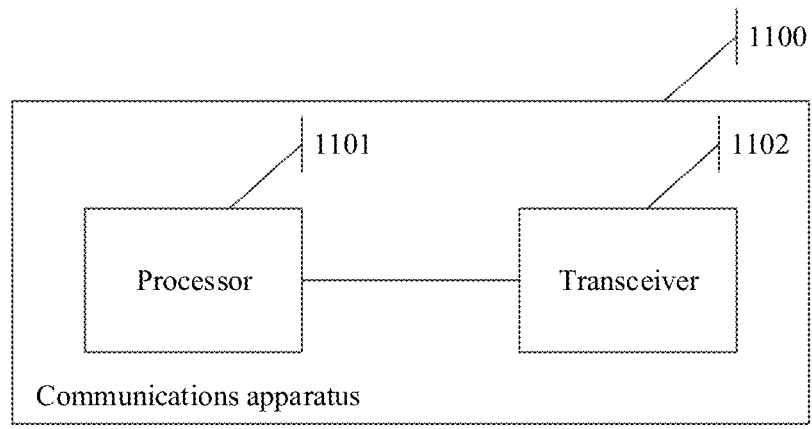
FIG. 11 is a schematic structural diagram of a communications apparatus that can implement a function of a second network device according to an embodiment of this application.

An embodiment of this application provides a third type of communications apparatus, and the communications apparatus is, for example, a third communications apparatus. Referring to FIG. 11, the communications apparatus is, for example, a communications apparatus 1100. The communications apparatus 1100 can implement functions of the first network device described above. For example, the communications apparatus 1100 may be a communications device, or the communications apparatus 1100 may be a chip disposed in a communications device. For example, the communications device may be the first network device described above. The communications apparatus 1100 may include a processor 1101 and a transceiver 1102, and the transceiver 1102 may be connected to the processor 1101. The processor 1101 may be configured to perform operations other than a sending/receiving operation performed by the second network device in the embodiment shown in FIG. 5, for example, S53 in the embodiment shown in FIG. 5 and/or another process used to support the technology described in this specification. The transceiver 1102 may be configured to perform all sending and receiving operations performed by the second network device in the embodiment shown in FIG. 5, for example, S54 and S56 in the embodiment shown in FIG. 5, and/or another process used to support the technology described in this specification.

For example, the processor 1101 is configured to determine a second time unit used by a terminal device to send a second signal, and the communications apparatus 1100 corresponds to a second radio access technology; and the transceiver 1102 is configured to send second indication information to the terminal device, where the second indication information is used to indicate the second time unit, and the second time unit is used by the terminal device to send the second signal to the communications apparatus 1100.

The communications apparatus 1100 and the communications apparatus 1000 may be different communications apparatuses, or may be a same communications apparatus.

All related content of the steps in the foregoing method embodiment may be cited in functional description of the corresponding functional modules. Details are not described herein again.

Figure 12:
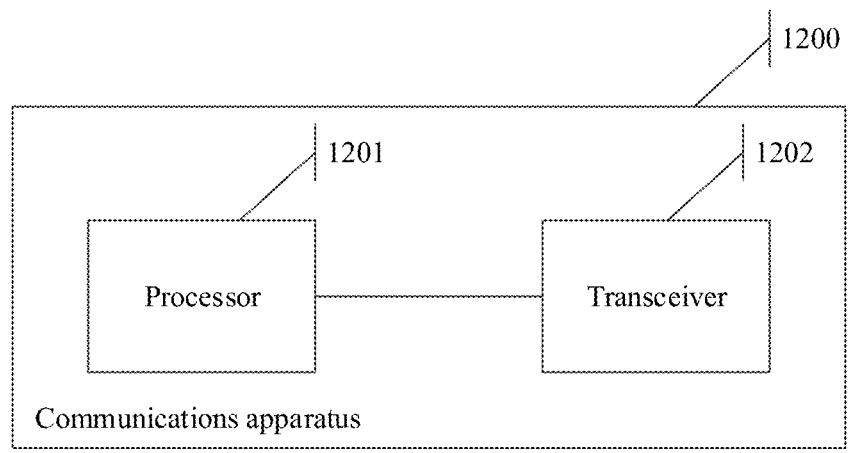
FIG. 12 is a schematic structural diagram of a communications apparatus that can implement a function of a terminal device according to an embodiment of this application.

An embodiment of this application provides a fourth type of communications apparatus, and the communications apparatus is, for example, a fourth communications apparatus. Referring to FIG. 12, the communications apparatus is, for example, a communications apparatus 1200. The communications apparatus 1200 can implement functions of the terminal device described above. For example, the communications apparatus 1200 may be a communications device, or the communications apparatus 1200 may be a chip disposed in a communications device. For example, the communications device may be the terminal device described above. The communications apparatus 1200 may include a processor 1201 and a transceiver 1202, and the transceiver 1202 may be connected to the processor 1201. The processor 1201 may be configured to perform operations other than a sending/receiving operation performed by the terminal device in the embodiment shown in FIG. 8, for example, an operation such as determining a third uplink time unit based on a reference TDD configuration and an offset and/or another process used to support the technology described in this specification. The transceiver 1202 may be configured to perform all sending and receiving operations performed by the terminal device in the embodiment shown in FIG. 8, for example, S81, S82, and S83 in the embodiment shown in FIG. 8, and/or another process used to support the technology described in this specification.

For example, the transceiver 1202 is configured to: receive first indication information from a first network device, and receive second indication information from the first network device, where the first indication information indicates a TDD configuration, the TDD configuration is used to indicate at least one first uplink time unit and at least one downlink time unit in a time domain unit, the time domain unit includes N time units, N is an integer greater than 1, the second indication information indicates a reference TDD configuration and an offset, the reference TDD configuration indicates k second uplink time units in the N time units, k is an integer greater than or equal to 1 and less than N, a value of the offset belongs to a value range, and the value range includes a part of or all of 0, 1, 2, 5, 6, or 7 and does not include 3, 4, 8, or 9; and the processor 1201 is configured to determine a third uplink time unit based on the reference TDD configuration and the offset, where the third uplink time unit is one or more of the at least one first uplink time unit, where the transceiver 1202 is further configured to send a first uplink signal to the first network device in the third uplink time unit.

In a possible implementation, numbers of the k second uplink time units in the N time units indicated by the reference TDD configuration are $n_1, n_2, \ldots,$ and $n_k$, and a value of the offset is i; and the third uplink time unit is one or more of time units whose numbers are $n_1+i, n_2+i, \ldots,$ and $n_k+i$ in the time domain unit, or one or more of time units whose numbers are $mod(n_1+i, N), mod(n_2+i, N), \ldots,$ and $mod(n_k+i, N)$ in the time domain unit.

In a possible implementation, the value range is {0, 1}, {0, 1, 5, 6}, {0, 5}, {0, 1, 2}, {0, 1, 2, 5, 6, 7}, {0, 1, 5}, or {0, 1, 2, 5, 6}.

In a possible implementation, the value range includes at least one or any combination of the following:

when the TDD configuration is a TDD configuration 0, the value range is {0, 1, 2, 5, 6, 7};
when the TDD configuration is a TDD configuration 1, the value range is {0, 1, 5, 6};
when the TDD configuration is a TDD configuration 2, the value range is {0, 5};
when the TDD configuration is a TDD configuration 3, the value range is {0, 1, 2};
when the TDD configuration is a TDD configuration 4, the value range is {0, 1}; or when the TDD configuration is a TDD configuration 6, the value range is {0, 1, 2, 5, 6}.

In a possible implementation, the value range includes at least one or any combination of the following:

when the reference TDD configuration is the TDD configuration 2, the value range is {0, 1, 2, 5, 6, 7};
when the reference TDD configuration is the TDD configuration 4, the value range is {0, 1, 5, 6}; or
when the reference TDD configuration is a TDD configuration 5, the value range is {0, 1, 2, 5, 6, 7}.

In a possible implementation, the value range includes at least one or any combination of the following:

when the reference TDD configuration is the TDD configuration 2, the value range is {0, 1, 2, 5, 6};
when the reference TDD configuration is the TDD configuration 4, the value range is {0, 1, 5}; or
when the reference TDD configuration is a TDD configuration 5, the value range is {0, 1, 2, 5, 6}.

All related content of the steps in the foregoing method embodiment may be cited in functional description of the corresponding functional modules. Details are not described herein again.

Figure 13:
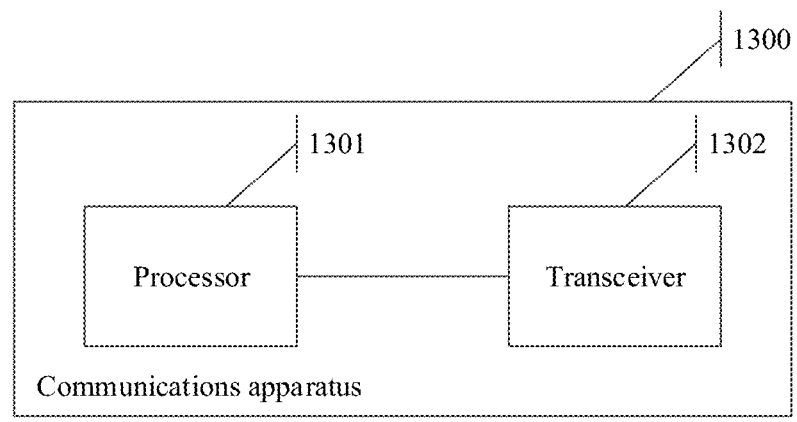
FIG. 13 is a schematic structural diagram of a communications apparatus that can implement a function of a first network device according to an embodiment of this application.

An embodiment of this application provides a fifth type of communications apparatus, and the communications apparatus is, for example, a fifth communications apparatus. Referring to FIG. 13, the communications apparatus is, for example, a communications apparatus 1300. The communications apparatus 1300 can implement functions of the first network device described above. For example, the communications apparatus 1300 may be a communications device, or the communications apparatus 1300 may be a chip disposed in a communications device. For example, the communications device may be the first network device described above. The communications apparatus 1300 may include a processor 1301 and a transceiver 1302, and the transceiver 1302 may be connected to the processor 1301. The processor 1301 may be configured to perform operations other than a sending/receiving operation performed by the first network device in the embodiment shown in FIG. 8, for example, an operation such as determining a third uplink time unit based on a reference TDD configuration and an offset and/or another process used to support the technology described in this specification. The transceiver 1302 may be configured to perform all sending and receiving operations performed by the first network device in the embodiment shown in FIG. 8, for example, S81, S82, and S83 in the embodiment shown in FIG. 8, and/or another process used to support the technology described in this specification.

For example, the transceiver 1302 is configured to: send first indication information to a terminal device, and send second indication information to the terminal device, where the first indication information indicates a TDD configuration, the TDD configuration is used to indicate at least one first uplink time unit and at least one downlink time unit in a time domain unit, the time domain unit includes N time units, N is an integer greater than 1, the second indication information indicates a reference TDD configuration and an offset, the reference TDD configuration indicates k second uplink time units in the N time units, k is an integer greater than or equal to 1 and less than N, a value of the offset belongs to a value range, and the value range includes a part of or all of 0, 1, 2, 5, 6, or 7 and does not include 3, 4, 8, or 9; and the processor 1301 is configured to determine a third uplink time unit based on the reference TDD configuration and the offset, where the third uplink time unit is one or more of the at least one first uplink time unit, where the transceiver 1302 is further configured to receive a first uplink signal from the terminal device in the third uplink time unit.

In a possible implementation, numbers of the k second uplink time units in the N time units indicated by the reference TDD configuration are $n_1, n_2, \ldots,$ and $n_k$, and a value of the offset is i; and the third uplink time unit is one or more of time units whose numbers are $n_1+i, n_2+i, \ldots,$ and $n_k+i$ in the time domain unit, or one or more of time units whose numbers are $\mod(n_1+i, N), \mod(n_2+i, N), \ldots,$ and $\mod(n_k+i, N)$ in the time domain unit.

In a possible implementation, the value range is $\{0, 1\}$, $\{0, 1, 5, 6\}$, $\{0, 5\}$, $\{0, 1, 2\}$, $\{0, 1, 2, 5, 6, 7\}$, $\{0, 1, 5\}$, or $\{0, 1, 2, 5, 6\}$.

In a possible implementation, the value range includes at least one or any combination of the following:
  when the TDD configuration is a TDD configuration 0, the value range is $\{0, 1, 2, 5, 6, 7\}$;
  when the TDD configuration is a TDD configuration 1, the value range is $\{0, 1, 5, 6\}$;
  when the TDD configuration is a TDD configuration 2, the value range is $\{0, 5\}$;
  when the TDD configuration is a TDD configuration 3, the value range is $\{0, 1, 2\}$;
  when the TDD configuration is a TDD configuration 4, the value range is $\{0, 1\}$; or
  when the TDD configuration is a TDD configuration 6, the value range is $\{0, 1, 2, 5, 6\}$.

In a possible implementation, the value range includes at least one or any combination of the following:
  when the reference TDD configuration is the TDD configuration 2, the value range is $\{0, 1, 2, 5, 6, 7\}$;
  when the reference TDD configuration is the TDD configuration 4, the value range is $\{0, 1, 5, 6\}$; or
  when the reference TDD configuration is a TDD configuration 5, the value range is $\{0, 1, 2, 5, 6, 7\}$.

In a possible implementation, the value range includes at least one or any combination of the following:
  when the reference TDD configuration is the TDD configuration 2, the value range is $\{0, 1, 2, 5, 6\}$;
  when the reference TDD configuration is the TDD configuration 4, the value range is $\{0, 1, 5\}$; or
  when the reference TDD configuration is a TDD configuration 5, the value range is $\{0, 1, 2, 5, 6\}$.

In a possible implementation, the processor 1301 is further configured to determine the value range based on the TDD configuration and/or the reference TDD configuration.

All related content of the steps in the foregoing method embodiment may be cited in functional description of the corresponding functional modules. Details are not described herein again.

Figure 14A:
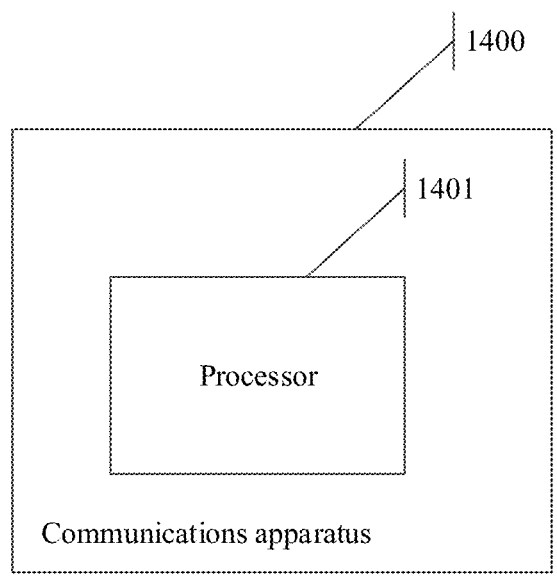
FIG. 14A and FIG. 14B are schematic structural diagrams of two communications apparatuses according to an embodiment of this application.

In a simple embodiment, a person skilled in the art may figure out that the foregoing several communications apparatuses may be further implemented through a structure of a communications apparatus 1400 shown in FIG. 14A. The communications apparatus 1400 can implement functions of the terminal device, the first network device, or the second network device described above. The communications apparatus 1400 may include a processor 1401.

When the communications apparatus 1400 is configured to implement functions of the terminal device in the foregoing description, the processor 1401 may be configured to perform operations other than a sending/receiving operation performed by the terminal device in the embodiment shown in FIG. 5, for example, S55 in the embodiment shown in FIG. 5 and/or another process used to support the technology described in this specification; when the communications apparatus 1400 is configured to implement functions of the first network device in the foregoing description, the processor 1401 may be configured to perform operations other than a sending/receiving operation performed by the first network device in the embodiment shown in FIG. 5, for example, S51 in the embodiment shown in FIG. 5 and/or another process used to support the technology described in this specification; or when the communications apparatus 1400 is configured to implement functions of the second network device in the foregoing description, the processor 1401 may be configured to perform operations other than a sending/receiving operation performed by the second network device in the embodiment shown in FIG. 5, for example, S53 in the embodiment shown in FIG. 5 and/or another process used to support the technology described in this specification.

Alternatively, when the communications apparatus 1400 is configured to implement functions of the terminal device in the foregoing description, the processor 1401 may be configured to perform operations other than a sending/receiving operation performed by the terminal device in the embodiment shown in FIG. 8, for example, an operation such as determining a third uplink time unit based on a reference TDD configuration and an offset and/or another process used to support the technology described in this specification; or when the communications apparatus 1400 is configured to implement functions of the first network device in the foregoing description, the processor 1401 may be configured to perform operations other than a sending/receiving operation performed by the first terminal device in the embodiment shown in FIG. 8, for example, S81, S82, and S83 in the embodiment shown in FIG. 8 and/or another process used to support the technology described in this specification.

The communications apparatus 1400 may be implemented by using a field-programmable gate array (field-programmable gate array, FPGA), an application-specific integrated chip (application specific integrated circuit, ASIC), a system on chip (system on chip, SoC), a central processing unit (central processor unit, CPU), a network processor (network processor, NP), a digital signal processor (digital signal processor, DSP), a micro controller unit (micro controller unit, MCU), a programmable logic device (programmable logic device, PLD), or another integrated chip. In this case, the communications apparatus 1400 may be disposed in the terminal device or the first network device in the embodiments of this application, so that the terminal device or the first network device implements the method provided in the embodiments of this application.

In an optional implementation, the communications apparatus 1400 may include a transceiver component, configured to communicate with another device. When the communications apparatus 1400 is configured to implement functions of the terminal device or the first network device or the second network device in the foregoing description, the transceiver component may be configured to perform at least one of S52, S54, or S56 in the embodiment shown in FIG. 5 and/or another process used to support the technology described in this specification. Alternatively, when the communications apparatus 1400 is configured to implement functions of the terminal device or the first network device described above, the transceiver component may be configured to perform S81, S82, and S83 in the embodiment shown in FIG. 8, and/or another process used to support the technology described in this specification.

Figure 14B:
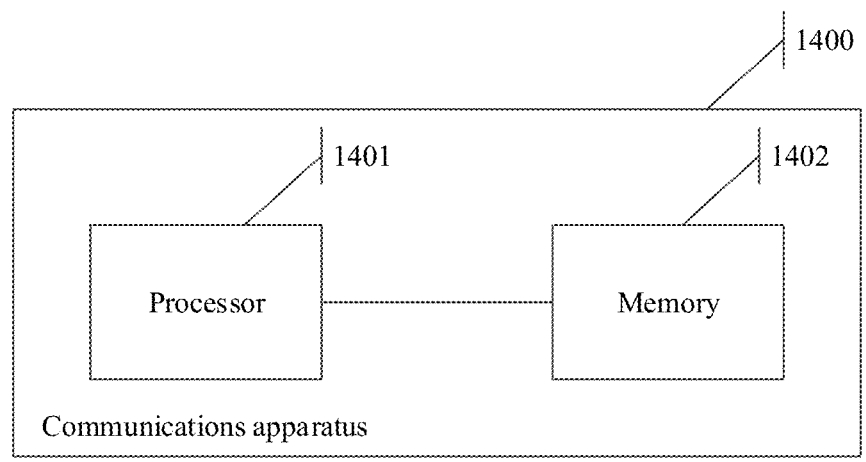

In an optional implementation, the communications apparatus 1400 may further include a memory 1402. Referring to FIG. 14B, the memory 1402 is configured to store computer programs or instructions, and the processor 1401 is configured to decode and execute these computer programs or the instructions. It should be understood that these computer programs or instructions may include function programs of the terminal device, the first network device, or the second network device. When the function programs of the terminal device are decoded and executed by the processor 1401, the terminal device can implement functions of the terminal device in the method provided in the embodiment shown in FIG. 5 in the embodiments of this application, or implement functions of the terminal device in the method provided in the embodiment shown in FIG. 8 in the embodiments of this application. When the function programs of the first network device are decoded and executed by the processor 1401, the first network device can implement functions of the first network device in the method provided in the embodiment shown in FIG. 5 in the embodiments of this application, or implement functions of the first network device in the method provided in the embodiment shown in FIG. 8 in the embodiments of this application. When the function programs of the second network device are decoded and executed by the processor 1401, the second network device can implement functions of the second network device in the method provided in the embodiment shown in FIG. 5 in the embodiments of this application.

In another optional implementation, the function programs of the terminal device, the first network device, or the second network device are stored in an external memory of the communications apparatus 1400. When the function programs of the terminal device are decoded and executed by the processor 1401, the memory 1402 temporarily stores some or all content of the function programs of the terminal device. When the function programs of the first network device are decoded and executed by the processor 1401, the memory 1402 temporarily stores some or all content of the function programs of the first network device. When the function programs of the second network device are decoded and executed by the processor 1401, the memory 1402 temporarily stores some or all content of the function programs of the second network device.

In another optional implementation, the function programs of the terminal device, the first network device, or the second network device are stored in an internal memory 1402 of the communications apparatus 1400. When the function programs of the terminal device are stored in the internal memory 1402 of the communications apparatus 1400, the communications apparatus 1400 may be disposed in the terminal device in the embodiments of this application. When the function programs of the first network device are stored in the internal memory 1402 of the communications apparatus 1400, the communications apparatus 1400 may be disposed in the first network device in the embodiments of this application. When the function programs of the second network device are stored in the internal memory 1402 of the communications apparatus 1400, the communications apparatus 1400 may be disposed in the second network device in the embodiments of this application.

In still another optional implementation, some content of the function programs of the terminal device is stored in the external memory of the communications apparatus 1400, and other content of the function programs of the terminal device is stored in the internal memory 1402 of the communications apparatus 1400. Alternatively, some content of the function programs of the first network device is stored in the external memory of the communications apparatus 1400, and other content of the function programs of the first network device is stored in the internal memory 1402 of the communications apparatus 1400. Alternatively, some content of the function programs of the second network device is stored in the external memory of the communications apparatus 1400, and other content of the function programs of the second network device is stored in the internal memory 1402 of the communications apparatus 1400.

In the embodiments of this application, the communications apparatus 900, the communications apparatus 1000, the communications apparatus 1100, the communications apparatus 1200, the communications apparatus 1300, and the communications apparatus 1400 may be presented in a form in which function modules are divided in correspondence with functions, or may be presented in a form in which function modules are divided in an integrated manner. The "module" herein may be an ASIC, a processor and a memory that execute one or more software or firmware programs, an integrated logic circuit, and/or another component that can provide the foregoing functions.

In addition, the first type of communications apparatus described above may be alternatively implemented in another form. For example, the communications apparatus includes a processing module and a transceiver module. For example, the processing module may be implemented through the processor 901, and the transceiver module may be implemented through the transceiver 902. The processing module may be configured to perform operations other than a sending/receiving operation performed by the terminal device in the embodiment shown in FIG. 5, for example, S55 in the embodiment shown in FIG. 5 and/or another process used to support the technology described in this specification. The transceiver module may be configured to perform all sending and receiving operations performed by the terminal device in the embodiment shown in FIG. 5, for example, S52, S54, and S56 in the embodiment shown in FIG. 5, and/or another process used to support the technology described in this specification.

For example, the processing module is configured to determine a first signal to be sent on a first uplink carrier, and determine a second signal to be sent on a second uplink carrier, where the first uplink carrier corresponds to a first radio access technology, and the second uplink carrier corresponds to a second radio access technology; and the transceiver module is configured to: when the processing module determines that a first transmission timing corresponding to the first signal is different from a second transmission timing corresponding to the second signal or that a difference between the first transmission timing and the second transmission timing is greater than a preset value, and if the first signal and the second signal overlap in time domain, send a third signal, where the third signal is the second signal sent on the second uplink carrier, or the third signal is the second signal sent on the second uplink carrier and a part of the first signal sent on the first uplink carrier, where the part of the first signal is carried on a symbol that does not overlap with a symbol corresponding to the second signal in time domain.

In a possible implementation, the first radio access technology is NR, and the second radio access technology is LTE.

In a possible implementation, the first signal is one of a PUCCH, a PUSCH, or an SRS, and the second signal is a PRACH.

In a possible implementation, a start moment of the first signal is later than a start moment of the second signal in time domain.

In a possible implementation, the processing module is further configured to discard the first signal, or discard a part of the first signal, where the part of the first signal is carried on a symbol that overlaps with a symbol corresponding to the second signal in time domain.

In a possible implementation, the transceiver module is further configured to receive first indication information from the first network device, where the first indication information is used to indicate the communications apparatus to send the first signal to the first network device.

In a possible implementation, the transceiver module is further configured to receive second indication information from the second network device, where the second indication information is used to indicate the communications apparatus to send the second signal to the second network device.

All related content of the steps in the foregoing method embodiment may be cited in functional description of the corresponding functional modules. Details are not described herein again.

The second type of communications apparatus described above may be alternatively implemented in another form. For example, the communications apparatus includes a processing module and a transceiver module. For example, the processing module may be implemented through the processor 1001, and the transceiver module may be implemented through the transceiver 1002. The processing module may be configured to perform operations other than a sending/receiving operation performed by the first network device in the embodiment shown in FIG. 5, for example, S51 in the embodiment shown in FIG. 5 and/or another process used to support the technology described in this specification. The transceiver module may be configured to perform all sending and receiving operations performed by the first network device in the embodiment shown in FIG. 5, for example, S52 and S56 in the embodiment shown in FIG. 5, and/or another process used to support the technology described in this specification.

For example, the processing module is configured to determine a first time unit that is used by a terminal device to send a first signal, and the communications apparatus corresponds to a first radio access technology; and the transceiver module is configured to send first indication information to the terminal device, where the first indication information is used to indicate the first time unit, and the first time unit is used by the terminal device to send the first signal to the communications apparatus.

All related content of the steps in the foregoing method embodiment may be cited in functional description of the corresponding functional modules. Details are not described herein again.

The third type of communications apparatus described above may be alternatively implemented in another form. For example, the communications apparatus includes a processing module and a transceiver module. For example, the processing module may be implemented through the processor 1101, and the transceiver module may be implemented through the transceiver 1102. The processing module may be configured to perform operations other than a sending/receiving operation performed by the second network device in the embodiment shown in FIG. 5, for example, S53 in the embodiment shown in FIG. 5 and/or another process used to support the technology described in this specification. The transceiver module may be configured to perform all sending and receiving operations performed by the second network device in the embodiment shown in FIG. 5, for example, S54 and S56 in the embodiment shown in FIG. 5, and/or another process used to support the technology described in this specification.

For example, the processing module is configured to determine a second time unit used by a terminal device to send a second signal, and the communications apparatus corresponds to a second radio access technology; and the transceiver module is configured to send second indication information to the terminal device, where the second indication information is used to indicate the second time unit, and the second time unit is used by the terminal device to send the second signal to the communications apparatus.

All related content of the steps in the foregoing method embodiment may be cited in functional description of the corresponding functional modules. Details are not described herein again.

The fourth type of communications apparatus described above may be alternatively implemented in another form. For example, the communications apparatus includes a processing module and a transceiver module. For example, the processing module may be implemented through the processor 1201, and the transceiver module may be implemented through the transceiver 1202. The processing module may be configured to perform operations other than a sending/receiving operation performed by the terminal device in the embodiment shown in FIG. 8, for example, an operation such as determining a third uplink time unit based on a reference TDD configuration and an offset and/or another process used to support the technology described in this specification. The transceiver module may be configured to perform all sending and receiving operations performed by the terminal device in the embodiment shown in FIG. 8, for example, S81, S82, and S83 in the embodiment shown in FIG. 8, and/or another process used to support the technology described in this specification.

For example, the transceiver module is configured to: receive first indication information from a first network device, and receive second indication information from the first network device, where the first indication information indicates a TDD configuration, the TDD configuration is used to indicate at least one first uplink time unit and at least one downlink time unit in a time domain unit, the time domain unit includes N time units, N is an integer greater than 1, the second indication information indicates a reference TDD configuration and an offset, the reference TDD configuration indicates k second uplink time units in the N time units, k is an integer greater than or equal to 1 and less than N, a value of the offset belongs to a value range, and the value range includes a part of or all of 0, 1, 2, 5, 6, or 7 and does not include 3, 4, 8, or 9; and the processing module is configured to determine a third uplink time unit based on the reference TDD configuration and the offset, where the third uplink time unit is one or more of the at least one first uplink time unit, where the transceiver module is further configured to send a first uplink signal to the first network device in the third uplink time unit.

In a possible implementation, numbers of the k second uplink time units in the N time units indicated by the reference TDD configuration are $n_1, n_2, \ldots,$ and $n_k$, and a value of the offset is i; and the third uplink time unit is one or more of time units whose numbers are $n_1+i, n_2+i, \ldots,$ and $n_k+i$ in the time domain unit, or one or more of time units whose numbers are $\mod(n_1+i, N), \mod(n_2+i, N), \ldots,$ and $\mod(n_k+i, N)$ in the time domain unit.

In a possible implementation, the value range is {0, 1}, {0, 1, 5, 6}, {0, 5}, {0, 1, 2}, {0, 1, 2, 5, 6, 7}, {0, 1, 5}, or {0, 1, 2, 5, 6}.

In a possible implementation, the value range includes at least one or any combination of the following:
  when the TDD configuration is a TDD configuration 0, the value range is {0, 1, 2, 5, 6, 7};
  when the TDD configuration is a TDD configuration 1, the value range is {0, 1, 5, 6};
  when the TDD configuration is a TDD configuration 2, the value range is {0, 5};
  when the TDD configuration is a TDD configuration 3, the value range is {0, 1, 2};
  when the TDD configuration is a TDD configuration 4, the value range is {0, 1}; or
  when the TDD configuration is a TDD configuration 6, the value range is {0, 1, 2, 5, 6}.

In a possible implementation, the value range includes at least one or any combination of the following:
  when the reference TDD configuration is the TDD configuration 2, the value range is {0, 1, 2, 5, 6, 7};
  when the reference TDD configuration is the TDD configuration 4, the value range is {0, 1, 5, 6}; or
  when the reference TDD configuration is a TDD configuration 5, the value range is {0, 1, 2, 5, 6, 7}.

In a possible implementation, the value range includes at least one or any combination of the following:
  when the reference TDD configuration is the TDD configuration 2, the value range is {0, 1, 2, 5, 6};
  when the reference TDD configuration is the TDD configuration 4, the value range is {0, 1, 5}; or
  when the reference TDD configuration is a TDD configuration 5, the value range is {0, 1, 2, 5, 6}.

All related content of the steps in the foregoing method embodiment may be cited in functional description of the corresponding functional modules. Details are not described herein again.

The fifth type of communications apparatus described above may be alternatively implemented in another form. For example, the communications apparatus includes a processing module and a transceiver module. For example, the processing module may be implemented through the processor 1301, and the transceiver module may be implemented through the transceiver 1302. The processing module may be configured to perform operations other than a sending/receiving operation performed by the first network device in the embodiment shown in FIG. 8, for example, an operation such as determining a third uplink time unit based on a reference TDD configuration and an offset and/or another process used to support the technology described in this specification. The transceiver module may be configured to perform all sending and receiving operations performed by the first network device in the embodiment shown in FIG. 8, for example, S81, S82, and S83 in the embodiment shown in FIG. 8, and/or another process used to support the technology described in this specification.

For example, the transceiver module is configured to: send first indication information to a terminal device, and send second indication information to the terminal device, where the first indication information indicates a TDD configuration, the TDD configuration is used to indicate at least one first uplink time unit and at least one downlink time unit in a time domain unit, the time domain unit includes N time units, N is an integer greater than 1, the second indication information indicates a reference TDD configuration and an offset, the reference TDD configuration indicates k second uplink time units in the N time units, k is an integer greater than or equal to 1 and less than N, a value of the offset belongs to a value range, and the value range includes a part of or all of 0, 1, 2, 5, 6, or 7 and does not include 3, 4, 8, or 9; and the processing module is configured to determine a third uplink time unit based on the reference TDD configuration and the offset, where the third uplink time unit is one or more of the at least one first uplink time unit, where the transceiver module is further configured to receive a first uplink signal from the terminal device in the third uplink time unit.

In a possible implementation, numbers of the k second uplink time units in the N time units indicated by the reference TDD configuration are $n_1, n_2, \ldots,$ and $n_k$, and a value of the offset is i; and the third uplink time unit is one or more of time units whose numbers are $n_1+i, n_2+i, \ldots,$ and $n_k+i$ in the time domain unit, or one or more of time units whose numbers are $\mod(n_1+i, N), \mod(n_2+i, N), \ldots,$ and $\mod(n_k+i, N)$ in the time domain unit.

In a possible implementation, the value range is {0, 1}, {0, 1, 5, 6}, {0, 5}, {0, 1, 2}, {0, 1, 2, 5, 6, 7}, {0, 1, 5}, or {0, 1, 2, 5, 6}.

In a possible implementation, the value range includes at least one or any combination of the following:
  when the TDD configuration is a TDD configuration 0, the value range is {0, 1, 2, 5, 6, 7};
  when the TDD configuration is a TDD configuration 1, the value range is {0, 1, 5, 6};
  when the TDD configuration is a TDD configuration 2, the value range is {0, 5};
  when the TDD configuration is a TDD configuration 3, the value range is {0, 1, 2};
  when the TDD configuration is a TDD configuration 4, the value range is {0, 1}; or
  when the TDD configuration is a TDD configuration 6, the value range is {0, 1, 2, 5, 6}.

In a possible implementation, the value range includes at least one or any combination of the following:
  when the reference TDD configuration is the TDD configuration 2, the value range is {0, 1, 2, 5, 6, 7};
  when the reference TDD configuration is the TDD configuration 4, the value range is {0, 1, 5, 6}; or
  when the reference TDD configuration is a TDD configuration 5, the value range is {0, 1, 2, 5, 6, 7}.

In a possible implementation, the value range includes at least one or any combination of the following:
  when the reference TDD configuration is the TDD configuration 2, the value range is {0, 1, 2, 5, 6};
  when the reference TDD configuration is the TDD configuration 4, the value range is {0, 1, 5}; or
  when the reference TDD configuration is a TDD configuration 5, the value range is {0, 1, 2, 5, 6}.

In a possible implementation, the processing module is further configured to determine the value range based on the TDD configuration and/or the reference TDD configuration.

All related content of the steps in the foregoing method embodiment may be cited in functional description of the corresponding functional modules. Details are not described herein again.

The communications apparatus 900, the communications apparatus 1000, the communications apparatus 1100, the communications apparatus 1200, the communications apparatus 1300, and the communications apparatus 1400 provided in the embodiments of this application may be configured to perform the method provided in the embodiment shown in FIG. 5 or the method provided in the embodiment shown in FIG. 8. Therefore, for technical effects that can be achieved by the communications apparatus, refer to the foregoing method embodiment. Details are not described herein again.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of the process and/or the block in the flowcharts and/or the block diagrams. These computer program instructions may be provided for a general purpose computer, a special purpose computer, an embedded processor, or a processor of any other programmable data processing device to generate a machine, so that the instructions executed by the computer or the processor of the any other programmable data processing device generate an apparatus for implementing a specific function in one or more processes in the flowcharts and/or in one or more blocks in the block diagrams.

All or some of the foregoing embodiments may be implemented through software, hardware, firmware, or any combination thereof in the foregoing embodiments. When software is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general purpose computer, a special purpose computer, a computer network, or another programmable apparatus. The computer instruction may be stored in a computer readable storage medium or may be transmitted from a computer readable storage medium to another readable storage medium. For example, the computer instruction may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (digital versatile disc, DVD)), a semiconductor medium (for example, a solid state drive (solid state disk, SSD)), or the like.

It is clear that a person skilled in the art can make various modifications and variations to the embodiments of this application without departing from the spirit and scope of this application. In this case, this application is intended to cover these modifications and variations in the embodiments of this application, provided that they fall within the scope of the following claims and their equivalent technologies.

What is claimed is:

1. A communication method, comprising:
receiving first indication information from a first network device, wherein the first indication information indicates a time division duplex (TDD) configuration, the TDD configuration indicates at least one first uplink time unit and at least one downlink time unit in a time domain unit, the time domain unit comprises N time units, and N is an integer greater than 1;
receiving second indication information from the first network device, wherein the second indication information indicates a reference TDD configuration and an offset, the reference TDD configuration indicates k second uplink time units in the N time units, k is an integer greater than or equal to 1 and less than N, a value of the offset belongs to a value range, and the value range comprises a part of or all of 0, 1, 2, 5, 6, and 7 and does not comprise 3, 4, 8, and 9; and
sending a first uplink signal to the first network device in a third uplink time unit based on the reference TDD configuration and the offset, wherein the third uplink time unit is one or more of the at least one first uplink time unit.

2. The method according to claim 1, wherein numbers of the k second uplink time units in the N time units indicated by the reference TDD configuration are $n_1, n_2, \ldots,$ and $n_k$, and a value of the offset is i; and
the third uplink time unit is one or more of time units whose numbers are $n_1+i, n_2+i, \ldots,$ and $n_k+i$ in the time domain unit, or one or more of time units whose numbers are $mod(n_1+i, N), mod(n_2+i, N), \ldots,$ and $mod(n_k+i, N)$ in the time domain unit.

3. The method according to claim 1, wherein the value range is {0, 1, 2, 5, 6}.

4. The method according to claim 1, wherein the value range comprises at least one or any combination of the following: {0, 1}, {0, 1, 5, 6}, {0, 5} or {0, 1, 2}.

5. The method according to claim 1, wherein the value range satisfies at least one or any combination of the following:
in response to the TDD configuration being a TDD configuration 1, and the reference TDD configuration being a TDD configuration 2, the value range is {0, 1} or {0, 1, 5, 6};
in response to the TDD configuration being a TDD configuration 1, and the reference TDD configuration being a TDD configuration 4, the value range is {0, 5};
in response to the TDD configuration being a TDD configuration 1, and the reference TDD configuration being a TDD configuration 5, the value range is {0, 1, 5, 6};
in response to the TDD configuration being a TDD configuration 2, and the reference TDD configuration being a TDD configuration 5, the value range is {0, 5};
in response to the TDD configuration being a TDD configuration 3, and the reference TDD configuration being a TDD configuration 4, the value range is {0, 1};
in response to the TDD configuration being a TDD configuration 3, and the reference TDD configuration being a TDD configuration 5, the value range is {0, 1, 2}; or in response to the TDD configuration being a TDD configuration 4, and the reference TDD configuration being a TDD configuration 5, the value range is {0, 1}.

6. A communication method, comprising:
sending first indication information to a terminal device, wherein the first indication information indicates a TDD configuration, the TDD configuration indicates at least one first uplink time unit and at least one downlink time unit in a time domain unit, the time domain unit comprises N time units, and N is an integer greater than 1;
sending second indication information to the terminal device, wherein the second indication information indicates a reference TDD configuration and an offset, the reference TDD configuration indicates k second uplink time units in the N time units, k is an integer greater than or equal to 1 and less than N, a value of the offset belongs to a value range, and the value range comprises a part of or all of 0, 1, 2, 5, 6, and 7 and does not comprise 3, 4, 8, and 9; and
receiving a first uplink signal from the terminal device in a third uplink time unit based on the reference TDD configuration and the offset, wherein the third uplink time unit is one or more of the at least one first uplink time unit.

7. The method according to claim 6, wherein numbers of the k second uplink time units in the N time units indicated by the reference TDD configuration are $n_1, n_2, \ldots,$ and $n_k$, and a value of the offset is i; and
the third uplink time unit is one or more of time units whose numbers are $n_1+i, n_2+i, \ldots,$ and $n_k+i$ in the time domain unit, or one or more of time units whose numbers are $mod(n_1+i, N), mod(n_2+i, N), \ldots,$ and $mod(n_k+i, N)$ in the time domain unit.

8. The method according to claim 6, wherein the value range is {0, 1, 2, 5, 6}.

9. The method according to claim 6, wherein the value range comprises at least one or any combination of the following: {0, 1}, {0, 1, 5, 6}, {0, 5} or {0, 1, 2}.

10. The method according to claim 6, wherein the value range satisfies at least one or any combination of the following:
in response to the TDD configuration being a TDD configuration 1, and the reference TDD configuration being a TDD configuration 2, the value range is {0, 1} or {0, 1, 5, 6};
in response to the TDD configuration being a TDD configuration 1, and the reference TDD configuration being a TDD configuration 4, the value range is {0, 5};
in response to the TDD configuration being a TDD configuration 1, and the reference TDD configuration being a TDD configuration 5, the value range is {0, 1, 5, 6};
in response to the TDD configuration being a TDD configuration 2, and the reference TDD configuration being a TDD configuration 5, the value range is {0, 5};
in response to the TDD configuration being a TDD configuration 3, and the reference TDD configuration being a TDD configuration 4, the value range is {0, 1};
in response to the TDD configuration being a TDD configuration 3, and the reference TDD configuration being a TDD configuration 5, the value range is {0, 1, 2}; or
in response to the TDD configuration being a TDD configuration 4, and the reference TDD configuration being a TDD configuration 5, the value range is {0, 1}.

11. An apparatus, comprising:
one or more processors in communications with a non-transitory memory storing computer instructions, wherein the instructions, when executed by the one or more processors, cause the apparatus to:
receive first indication information from a first network device, wherein the first indication information indicates a TDD configuration, the TDD configuration is used to indicate at least one first uplink time unit and at least one downlink time unit in a time domain unit, the time domain unit comprises N time units, N is an integer greater than 1;
receive second indication information from the first network device, wherein the second indication information indicates a reference TDD configuration and an offset, the reference TDD configuration indicates k second uplink time units in the N time units, k is an integer greater than or equal to 1 and less than N, a value of the offset belongs to a value range, and the value range comprises a part of or all of 0, 1, 2, 5, 6, and 7 and does not comprise 3, 4, 8, and 9; and
send a first uplink signal to the first network device in a third uplink time unit based on the reference TDD configuration and the offset, wherein the third uplink time unit is one or more of the at least one first uplink time unit.

12. The apparatus according to claim 11, wherein numbers of the k second uplink time units in the N time units indicated by the reference TDD configuration are $n_1, n_2, \ldots,$ and $n_k$, and a value of the offset is i; and
the third uplink time unit is one or more of time units whose numbers are $n_1+i, n_2+i, \ldots,$ and $n_k+i$ in the time domain unit, or one or more of time units whose numbers are $mod(n_1+i, N), mod(n_2+i, N), \ldots,$ and $mod(n_k+i, N)$ in the time domain unit.

13. The apparatus according to claim 11, wherein the value range is {0, 1, 2, 5, 6}.

14. The apparatus according to claim 11, wherein the value range comprises at least one or any combination of the following: {0, 1}, {0, 1, 5, 6}, {0, 5} or {0, 1, 2}.

15. The apparatus according to claim 11, wherein the value range satisfies at least one or any combination of the following:
in response to the TDD configuration being a TDD configuration 1, and the reference TDD configuration being a TDD configuration 2, the value range is {0, 1} or {0, 1, 5, 6};
in response to the TDD configuration being a TDD configuration 1, and the reference TDD configuration being a TDD configuration 4, the value range is {0, 5};
in response to the TDD configuration being a TDD configuration 1, and the reference TDD configuration being a TDD configuration 5, the value range is {0, 1, 5, 6};
in response to the TDD configuration being a TDD configuration 2, and the reference TDD configuration being a TDD configuration 5, the value range is {0, 5};
in response to the TDD configuration being a TDD configuration 3, and the reference TDD configuration being a TDD configuration 4, the value range is {0, 1};
in response to the TDD configuration being a TDD configuration 3, and the reference TDD configuration being a TDD configuration 5, the value range is {0, 1, 2}; or
in response to the TDD configuration being a TDD configuration 4, and the reference TDD configuration being a TDD configuration 5, the value range is {0, 1}.

16. An apparatus, comprising:
one or more processors in communications with a non-transitory memory storing computer instructions, wherein the instructions, when executed by the one or more processors, cause the apparatus to:
send first indication information to a terminal device, wherein the first indication information indicates a TDD configuration, the TDD configuration indicates at least one first uplink time unit and at least one downlink time unit in a time domain unit, the time domain unit comprises N time units, N is an integer greater than 1;
send second indication information to the terminal device, wherein the second indication information indicates a reference TDD configuration and an offset, the reference TDD configuration indicates k second uplink time units in the N time units, k is an integer greater than or equal to 1 and less than N, a value of the offset belongs to a value range, and the value range comprises a part of or all of 0, 1, 2, 5, 6, and 7 and does not comprise 3, 4, 8, and 9; and
receive a first uplink signal from the terminal device in a third uplink time unit based on the reference TDD configuration and the offset, wherein the third uplink time unit is one or more of the at least one first uplink time unit.

17. The apparatus according to claim 16, wherein numbers of the k second uplink time units in the N time units indicated by the reference TDD configuration are $n_1$, $n_2$, ..., and $n_k$, and a value of the offset is i; and
the third uplink time unit is one or more of time units whose numbers are $n_1+i$, $n_2+i$, ..., and $n_k+i$ in the time domain unit, or one or more of time units whose numbers are $mod(n_1+i, N)$, $mod(n_2+i, N)$, ..., and $mod(n_k+i, N)$ in the time domain unit.

18. The apparatus according to claim 16, wherein the value range is {0, 1, 2, 5, 6}.

19. The apparatus according to claim 16, wherein the value range comprises at least one or any combination of the following: {0, 1}, {0, 1, 5, 6}, {0, 5} or {0, 1, 2}.

20. The apparatus according to claim 16, wherein the value range satisfies at least one or any combination of the following:
in response to the TDD configuration being a TDD configuration 1, and the reference TDD configuration being a TDD configuration 2, the value range is {0, 1} or {0, 1, 5, 6};
in response to the TDD configuration being a TDD configuration 1, and the reference TDD configuration being a TDD configuration 4, the value range is {0, 5};
in response to the TDD configuration being a TDD configuration 1, and the reference TDD configuration being a TDD configuration 5, the value range is {0, 1, 5, 6};
in response to the TDD configuration being a TDD configuration 2, and the reference TDD configuration being a TDD configuration 5, the value range is {0, 5};
in response to the TDD configuration being a TDD configuration 3, and the reference TDD configuration being a TDD configuration 4, the value range is {0, 1};
in response to the TDD configuration being a TDD configuration 3, and the reference TDD configuration being a TDD configuration 5, the value range is {0, 1, 2}; or
in response to the TDD configuration being a TDD configuration 4, and the reference TDD configuration being a TDD configuration 5, the value range is {0, 1}.

* * * * *

UNITED STATES PATENT AND TRADEMARK OFFICE
CERTIFICATE OF CORRECTION

PATENT NO. : 12,081,497 B2
APPLICATION NO. : 17/489358
DATED : September 3, 2024
INVENTOR(S) : Xie et al.

Page 1 of 1

It is certified that error appears in the above-identified patent and that said Letters Patent is hereby corrected as shown below:

On the Title Page

Page 2: item [56], Left-Hand Column, NPL Citation #2: "TS 36.211 V15.5.0, pp. 1-238, Generation Partnership Project," should read as -- TS 36.211 V15.5.0, pp. 1-238, 3rd Generation Partnership Project, --.

Page 2: item [56], Right-Hand Column, NPL Citation #13: "Partnership Project, Valnonnem France (Feb. 24-Mar. 6, 2020)." should read as -- Partnership Project, Valbonne, France (Feb. 24-Mar. 6, 2020). --.

Signed and Sealed this
Twentieth Day of May, 2025

Coke Morgan Stewart
*Acting Director of the United States Patent and Trademark Office*